(12) United States Patent
Ueki et al.

(10) Patent No.: US 12,155,451 B2
(45) Date of Patent: Nov. 26, 2024

(54) CONTROL SYSTEM, RELAY DEVICE, AND RELAY PROGRAM

(71) Applicant: OMRON CORPORATION, Kyoto (JP)

(72) Inventors: Takuya Ueki, Ritto (JP); Yuta Nagata, Kusatsu (JP)

(73) Assignee: OMRON CORPORATION, Kyoto (JP)

( * ) Notice: Subject to any disclaimer, the term of this patent is extended or adjusted under 35 U.S.C. 154(b) by 577 days.

(21) Appl. No.: 17/434,787

(22) PCT Filed: Feb. 26, 2020

(86) PCT No.: PCT/JP2020/007781
§ 371 (c)(1),
(2) Date: Aug. 30, 2021

(87) PCT Pub. No.: WO2020/189204
PCT Pub. Date: Sep. 24, 2020

(65) Prior Publication Data
US 2022/0140888 A1   May 5, 2022

(30) Foreign Application Priority Data
Mar. 15, 2019 (JP) .................... 2019-049106

(51) Int. Cl.
*H04B 7/155* (2006.01)
*G05B 19/05* (2006.01)

(52) U.S. Cl.
CPC .......... *H04B 7/155* (2013.01); *G05B 19/05* (2013.01); *G05B 2219/15026* (2013.01)

(58) Field of Classification Search
CPC .............. G05B 19/058; G05B 19/0428; G05B 19/048; G05B 19/4155;
(Continued)

(56) References Cited

U.S. PATENT DOCUMENTS

2001/0037436 A1   11/2001 Blumenstock
2004/0204775 A1   10/2004 Keyes et al.
(Continued)

FOREIGN PATENT DOCUMENTS

CN   101937225 A   1/2011
CN   102792237 A   11/2012
(Continued)

OTHER PUBLICATIONS

Extended European Search Report dated Nov. 9, 2022 in European Application No. 20773044.1.
(Continued)

*Primary Examiner* — Ajibola A Akinyemi
(74) *Attorney, Agent, or Firm* — Sughrue Mion, PLLC

(57) ABSTRACT

A control system includes a controller, a transmission unit, an application executing unit, and a management unit. The controller executes a control program controlling a control target, and manages pieces of process data referred to or updated in the control program. The transmission unit transmits data sets including values of the pieces of process data managed by the controller, each of the data sets including one or more process data values. The application execution unit executes one or more applications using the value of the process data included in the data set transmitted by the transmission unit. The management unit determines a data set validating transmission in the data sets transmittable by the transmission unit according to the application executed by the application execution unit.

3 Claims, 13 Drawing Sheets

(58) Field of Classification Search
CPC .......... G05B 2219/14038; G05B 2219/23027; G05B 19/05; G05B 2219/1214; G05B 2219/15079; G05B 23/0216; H04B 7/185
USPC .......................................................... 455/7
See application file for complete search history.

(56) References Cited

U.S. PATENT DOCUMENTS

| | | |
|---|---|---|
| 2005/0203648 A1 | 9/2005 | Martin |
| 2010/0146097 A1* | 6/2010 | Yoshida ................ H04L 67/14 709/227 |
| 2012/0239201 A1 | 9/2012 | Kobayashi et al. |
| 2014/0277604 A1 | 9/2014 | Nixon et al. |
| 2015/0113521 A1 | 4/2015 | Suzuki et al. |
| 2015/0378340 A1 | 12/2015 | Nagata |
| 2016/0109875 A1 | 4/2016 | Majewshi et al. |
| 2019/0266162 A1 | 8/2019 | Naito et al. |
| 2019/0303063 A1* | 10/2019 | Kato ..................... G06F 3/1285 |
| 2020/0166388 A1 | 5/2020 | Naito |

FOREIGN PATENT DOCUMENTS

| | | |
|---|---|---|
| CN | 104049575 A1 | 9/2014 |
| CN | 104570823 A | 4/2015 |
| CN | 104834286 A | 8/2015 |
| EP | 3441835 A1 | 2/2019 |
| JP | 4-10107 A | 1/1992 |
| JP | 2000-242326 A | 9/2000 |
| JP | 2002-358105 A | 12/2002 |
| JP | 2010-224939 A | 10/2010 |
| JP | 2016-12173 A | 1/2016 |
| JP | 2016-126495 A | 7/2016 |
| JP | 2017-511942 A | 4/2017 |
| JP | 2017-146803 A | 8/2017 |
| JP | 2018-106493 A | 7/2018 |
| JP | 6451820 B1 | 1/2019 |
| WO | 2019/031162 A1 | 2/2019 |

OTHER PUBLICATIONS

Chinese Office Action issued Jan. 15, 2024 in Application No. 202080017364.4.
International Search Report for PCT/JP2020/007781 dated Apr. 21, 2020 (PCT/ISA/210).
Written Opinion of the International Searching Authority for PCT/JP2020/007781 dated Apr. 21, 2020 (PCT/ISA/210).
Communication dated Feb. 8, 2022 from the Japanese Patent Office in Application No. 2019-049106.
Chinese Office Action dated Jun. 14, 2024 in Application No. 202080017364.4.

* cited by examiner

CONTROL SYSTEM, RELAY DEVICE, AND RELAY PROGRAM

CROSS REFERENCE TO RELATED APPLICATIONS

This application is a National Stage of International Application No. PCT/JP2020/007781 filed Feb. 26, 2020, claiming priority based on Japanese Patent Application No. 2019-049106 filed Mar. 15, 2019, the entire contents of each of which being herein incorporated by reference in their entireties.

TECHNICAL FIELD

The present invention relates to a control system in which one or a plurality of data sets including a value of process data are transmitted, a relay device included in the control system, and a relay process executed in the relay device.

BACKGROUND ART

A control device such as a PLC (Programmable Logic Controller) is introduced in various manufacturing sites. The control device is a kind of computer, and executes a control program designed according to a manufacturing device or a manufacturing facility. Such a control device is communicably connected to an information processing device such as a human machine interface (HMI).

For example, the information processing device uses information from the control device to graphically display an operating state or the like of a control target of the control device, or uses information from the control device to execute an application different from the application that is displayed.

For example, Japanese Patent Laying-Open No. 2017-146803 (PTL 1) discloses a programmable display as an example of an information processing device connected to a PLC. The programmable display displays information held by the PLC.

CITATION LIST

Patent Literature

PTL 1: Japanese Patent Laying-Open No. 2017-146803

SUMMARY OF INVENTION

Technical Problem

The programmable display disclosed in PTL 1 updates and displays the information held by the PLC every predetermined period. When such a programmable display is network-connected to the PLC, data is transmitted every predetermined period on the network.

When the data transmitted every predetermined period increases, a communication load increases. An object of the present invention is to provide a technique for preventing the increase of the communication load associated with the increase of an amount of transmitted data.

Solution to Problem

A control system according to an example of the present disclosure includes: a control unit that executes a control program controlling a control target and manages a plurality of pieces of process data referred to or updated in the control program; and a transmission unit capable of transmitting a plurality of data sets including the values of the plurality of pieces of process data managed by the control unit. Each of the plurality of data sets includes one or a plurality of predetermined process data values. The control system includes: an application execution unit that executes one or a plurality of applications using a value of process data included in a data set transmitted by the transmission unit; and a management unit that determines a data set for which transmission is validated in a plurality of data sets transmittable by the transmission unit according to the application currently executed by the application execution unit.

According to the present disclosure, only the necessary data set in the plurality of data sets can be transmitted according to the application executed by the application execution unit, and the increase of the communication load can be prevented.

In the above disclosure, the management unit may instruct the transmission unit to stop transmission of an unnecessary data set when the unnecessary data set is generated in the data set transmitted by the transmission unit according to the application executed by the application execution unit. According to this configuration, the transmission of the unnecessary data set can be explicitly stopped.

In the above disclosure, the application execution unit may change an application to be executed according to a user operation, and notify the management unit of a data set necessary for the application after the change. According to this configuration, the data set to be transmitted can be determined according to an explicit request in the application execution unit.

In the above disclosure, the management unit may instruct the transmission unit to stop transmission of the data set not received by the application execution unit. According to this configuration, the transmission of the unnecessary data set can be stopped even when the explicit request is not made from the application execution unit.

In the above disclosure, the control system includes a control device and a display device. The control device and the transmission unit may be mounted on the control device, and the application execution unit may be mounted on the display device. The management unit may be mounted independently of the control device and the display device. According to this configuration, the management unit can appropriately determine the data set to be transmitted according to each situation of the control device and the display device.

In the above disclosure, the control system includes a control device and a display device. The control unit, the transmission unit, and the management unit may be mounted on the control device, and the application execution unit may be mounted on the control device. According to this configuration, because the data set to be transmitted can be managed only by the control device and the display device, necessity to provide an extra device is eliminated.

In the above disclosure, the control system further includes a determination unit that determines the plurality of data sets based on the process data used in each of one or the plurality of applications executed by the application execution unit. According to this configuration, the appropriate data set can be determined according to the application executed by the application execution unit.

According to another example of the present disclosure, a relay device disposed in a control system is provided. The control system includes: a control unit that executes a control program controlling a control target and manages a plurality of pieces of process data referred to or updated in the control program; and a transmission unit capable of transmitting a plurality of data sets including the values of the plurality of pieces of process data managed by the control unit. Each of the plurality of data sets includes one or a plurality of predetermined process data values. The control system includes an application execution unit that executes one or a plurality of applications using a value of process data included in the data set transmitted by the transmission unit. The relay device determines a data set validating transmission in the plurality of data sets transmittable by the transmission unit according to the application executed by the application execution unit.

According to still another example of the present disclosure, a relay program executed by an information processing device disposed in a control system is provided. The control system includes: a control unit that executes a control program controlling a control target and manages a plurality of pieces of process data referred to or updated in the control program; and a transmission unit capable of transmitting a plurality of data sets including the values of the plurality of pieces of process data managed by the control unit. Each of the plurality of data sets includes one or a plurality of predetermined process data values. The control system includes an application execution unit that executes one or a plurality of applications using a value of process data included in the data set transmitted by the transmission unit. The relay program causes the information processing device to execute: managing information about the plurality of data sets transmittable by the transmission unit; and determining a data set to validate transmission in the plurality of data sets transmittable by the transmission unit according to the application executed by the application execution unit.

Advantageous Effects of Invention

According to the present invention, the increase of the communication load associated with the increase of the data amount can be prevented.

DESCRIPTION OF EMBODIMENTS

Figure 1:
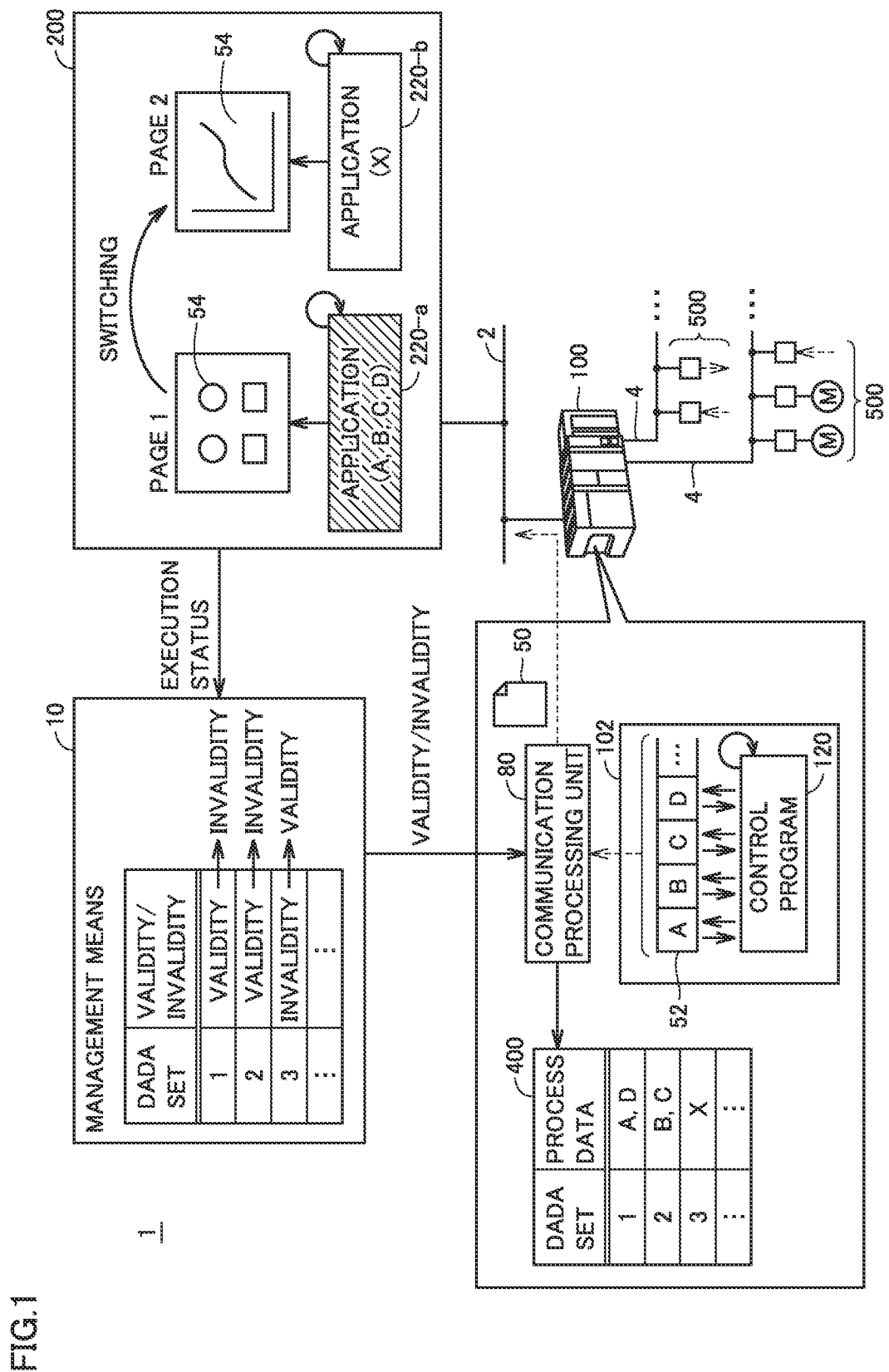
FIG. 1 is a schematic diagram illustrating an application scene of a control system 1.

Hereinafter, an embodiment of the present invention will be described with reference to the drawings. In the following description, the same parts and components are denoted by the same reference numeral. Their names and functions are the same. Thus, the detailed description thereof will not be repeated. The following embodiment and modification described below may selectively be combined as appropriate.

<A. Application Example>

FIG. 1 is a schematic diagram illustrating an application scene of a control system 1. The control system 1 includes a controller 100 that is an example of a control device, an HMI 200 that is an example of a display, and management means 10.

In the example of FIG. 1, HMI 200 and controller 100 are communicably connected by an information system network 2. For example, information system network 2 is a network conforming to a communication standard capable of performing data exchange without depending on a vendor, a type of an operating system (OS), or the like. For example, object linking and embedding for process control unified architecture (OPC UA) is known as the communication standard.

The communication standard adopted in information system network 2 is not limited to the OPC UA. For example, information system network 2 may be a network conforming to the communication standard specific to a specific vendor or OS, or may be a network conforming to EtherNet/IP (registered trademark) that is an industrial open network in which a control protocol is mounted on Ethernet (registered trademark). Communication between the HMI 200 and the controller 100 does not need to be directly performed, and a relay device may be provided between HMI 200 and controller 100.

In the example of FIG. 1, communication between HMI 200 and controller 100 is performed by a publish-subscribe communication scheme of the OPC UA. Hereinafter, communication to which a public-subscribe communication scheme of OPC-UA is applied is also referred to as PubSub communication.

Control system 1 may include a plurality of controllers 100. Control system 1 may include a plurality of HMIs 200. In addition, control system 1 may have a configuration in which one HMI 200 is communicably connected to one controller 100, a configuration in which one HMI 200 is communicably connected to a plurality of controllers 100, a configuration in which a plurality of HMIs 200 are communicably connected to one controller 100, or a configuration in which the plurality of HMIs 200 are communicably connected to the plurality of controllers 100. In the example of FIG. 1, control system 1 has a configuration in which one HMI 200 is communicably connected to one controller 100.

Controller 100 includes control means 102 and a communication processing unit 80. Control means 102 executes a control program 120 controlling a field device 500 and the like that are control target, and manages a plurality of pieces of process data 52 referred to or updated in control program 120.

As used herein, the "process data" is a term including any data that can be referred to by controller 100 or HMI 200. More specifically, the "process data" may include input data acquired from the field device, output data (command value) calculated by the control operation and provided to the field device, data temporarily calculated in order to execute the control arithmetic operation, data indicating operation content by the user, and the like.

For example, processor 110 (see FIG. 9) executes a system program 172 implementing basic functions of controller 100, thereby implementing control means 102.

Field device 500 includes various industrial devices that automate a production process, and includes a device that gives some physical action to a manufacturing device, a production line, or the like (hereinafter, also collectively referred to as a "field") and an input and output device that exchanges information with the field. For example, field device 500 includes a servo driver that controls a servo motor, a robot controller that controls a robot, a sensor that is a device that collects data, an actuator that moves a conveyor, a remote input and output (I/O) device, or the like.

In the example of FIG. 1, controller 100 and field device 500 are communicably connected to each other by a control system network 4. Preferably, a network that performs fixed-period communication guaranteeing a data arrival time is used as control system network 4. EtherCAT (registered trademark), EtherNet/IP (registered trademark), DeviceNet (registered trademark), CompoNet (registered trademark), and the like are known as the network that performs the fixed-period communication.

Communication processing unit 80 is an implementation example of transmission means, and is configured to be able to transmit a plurality of data sets 50 including values of the plurality of pieces of process data 52 managed by control means 102. Specifically, communication processing unit 80 transmits data set 50 with reference to transmission setting 400 defining a combination of process data 52 stored in each data set 50. That is, each of data sets 50 includes a value of one or a plurality of predetermined process data.

Process data 52 includes data input from field device 500 to controller 100, data output from controller 100 to field device 500, and data used for the execution of control program 120 or state management of controller 100. Process data 52 is periodically updated in association with the execution of control program 120.

HMI 200 is an implementation example of application execution means, and executes one or a plurality of applications 220. The application execution means may include a plurality of HMIs. That is, the application execution means can include an entire execution subject of the application that can be executed in control system 1.

Each application 220 uses the value of process data 52 included in data set 50 transmitted by controller 100. That is, HMI 200 executes one or a plurality of applications using the value of process data 52 included in data set 50 transmitted by controller 100. Hereinafter, the value of process data 52 may be simply referred to as "process data 52". HMI 200 executes application 220 to present various types of information obtained by the execution of control program 120 to the operator.

For example, in the example of FIG. 1, a page 1 is generated by execution of an application 220-a, and a page 2 is generated by execution of an application 220-b. In addition, application 220-a uses the values of process data A, B, C, D to display an object 54 on page 1. On the other hand, application 220b displays object 54 on page 2 using the value of a process data X. For example, when receiving a page switching operation from a user, HMI 200 changes executed application 220. It is assumed that an alphabet illustrated below the application in FIG. 1 indicates the process data used in the application.

Management means 10 determines data set 50 for which transmission is validated in data sets 50 transmittable by communication processing unit 80 according to the application executed by HMI 200. For example, management means 10 determines validated data set 50 based on an execution status of application 220 executable by HMI 200 such that process data 52 used for currently-executed application 220 is distributed from controller 100 toward HMI 200.

For example, in the example of FIG. 1, when application 220-a in which the values of process data A, B, C, D are used is executed, management means 10 validates the transmission of a data set 1 and a data set 2. When the page switching operation or the like by the user is received to switch executed application 220 from application 220-a to application 220-b, management means 10 invalidates the transmission of data set 1 and data set 2 and validates the transmission of a data set 3.

As described above, because management means 10 can define the validity and the invalidity of the transmission of data set 50 according to currently-executed application 220, the data set including the process data used for the application that is not being executed can be prevented from being transmitted.

The information processing device that executes application 220 using process data 52 managed by controller 100 is not limited to HMI 200. For example, the information processing device may be a database that collects information regarding traceability measured from field device 500 that is the control target, a supervisory control and data acquisition (SCADA) device that performs the process control and centralized monitoring, or the like.

Furthermore, the information processing device is not limited to the device connected to controller 100 through information system network 2, but may be a robot controller that controls a robot connected through control system network 4, an actuator, another controller, or the like. That is, application 220 is not limited to one intended to present the information, but may be one intended to implement the function using process data 52 managed by controller 100. In the following, application 220 is intended to present information, and will be described as a program that provides a function of displaying an image on a display.

In the embodiment, four types of the process data are used in entire control system 1 in order to simplify the description. However, in an actual production site, more types of process data are used for applications. For this reason, when all process data 52 used by all executable applications 220 are distributed, a load on each device included in control system 1 increases.

Accordingly, as in the embodiment, management means 10 defines the validity and the invalidity of the transmission of data set 50 according to currently-executed application 220, so that process data 52 required by application 220 can be distributed while reducing the load on each device.

<B. PubSub Communication>

Figure 2:
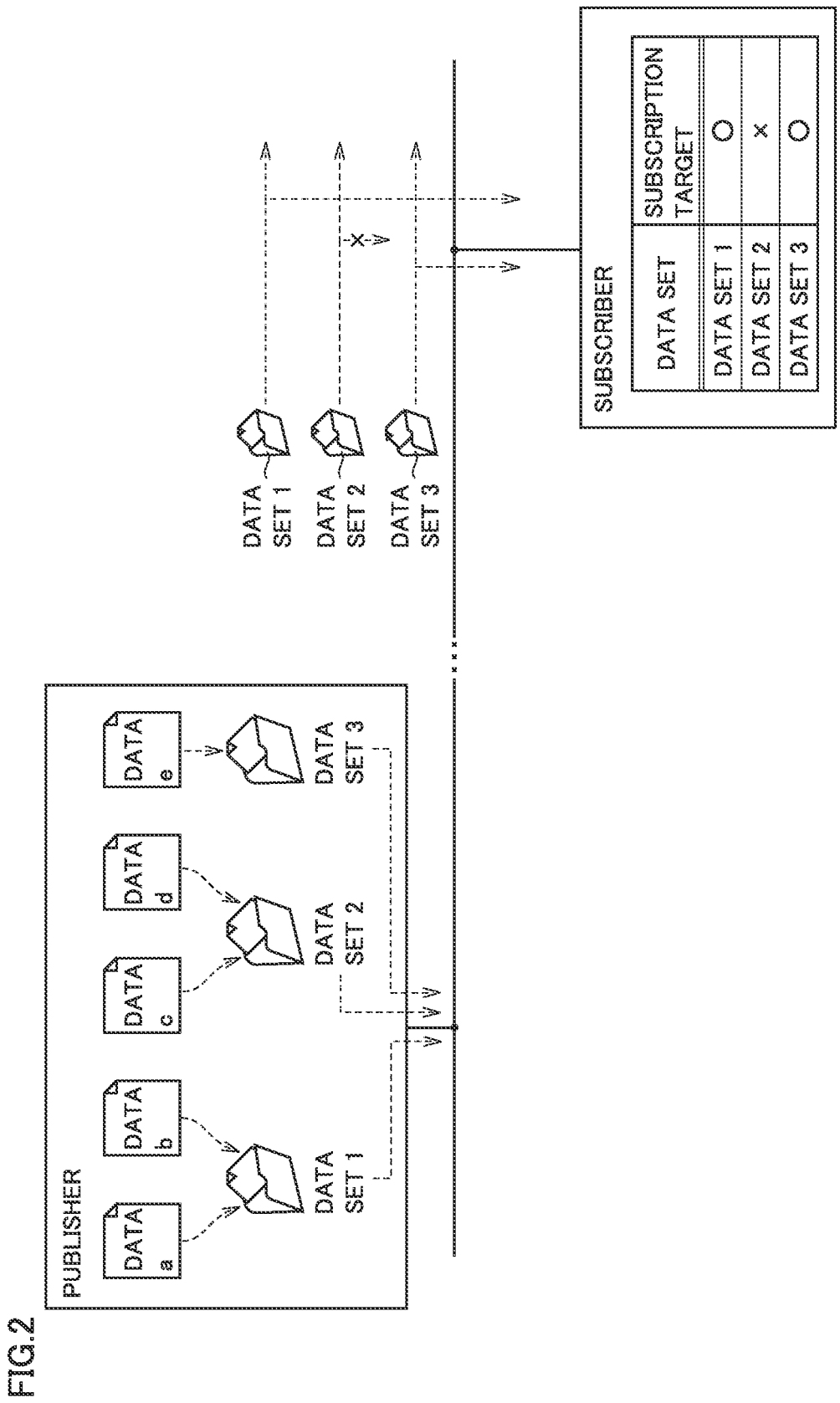
FIG. 2 is a view illustrating an outline of PubSub communication.

FIG. 2 is a view illustrating an outline of the PubSub communication. In the following description, a side that distributes data is referred to as a "publisher", and a side that subscribes to data distributed by the publisher is referred to as a "subscriber". In control system 1 according to the embodiment, controller 100 corresponds to the publisher that distributes the data. On the other hand, HMI 200 corresponds to the subscriber that subscribes to the data distributed by controller 100.

The publisher generates and distributes a data set storing one or a plurality of pieces of data. The publisher transmits the data set to a network including the publisher and the subscriber without specifying a destination. This transmission form may be multicast or unicast. Depending on circumstances, this transmission form may be broadcast.

The subscriber manages which data set is set to a subscription target among data sets distributed on the network accessible by the subscriber. For example, in the example of FIG. 2, the subscriber subscribes to a data set 1 and a data set 3 among data sets 1 to 3. For this reason, the subscriber receives only data set 1 and data set 3 among data sets 1 to 3 distributed by the publisher. When the subscriber changes the subscription target, the subscriber changes a reception target.

The subscriber may receive the data set that is not the subscription target, and in this case, the subscriber may perform processing of discarding the data set that is not the subscription target.

The method by which the subscriber manages the subscription target is not limited to the method in FIG. 2. For example, whether to subscribe to each piece of data may be managed. Whether to subscribe to each set of data different from the data set may be managed as another method.

Figure 3:
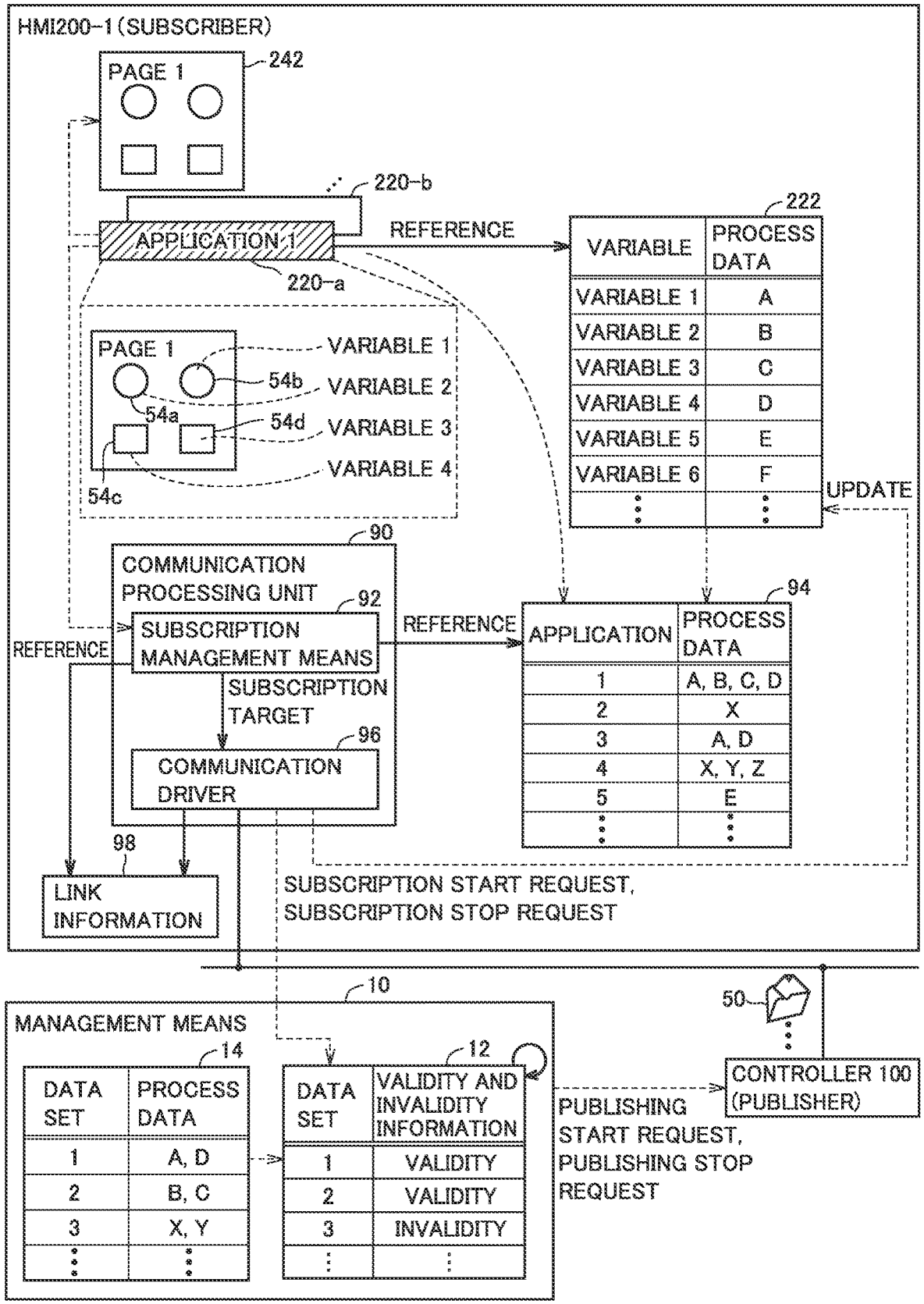
FIG. 3 is a view illustrating an outline of an HMI 200 that functions as a subscriber.
Figure 4:
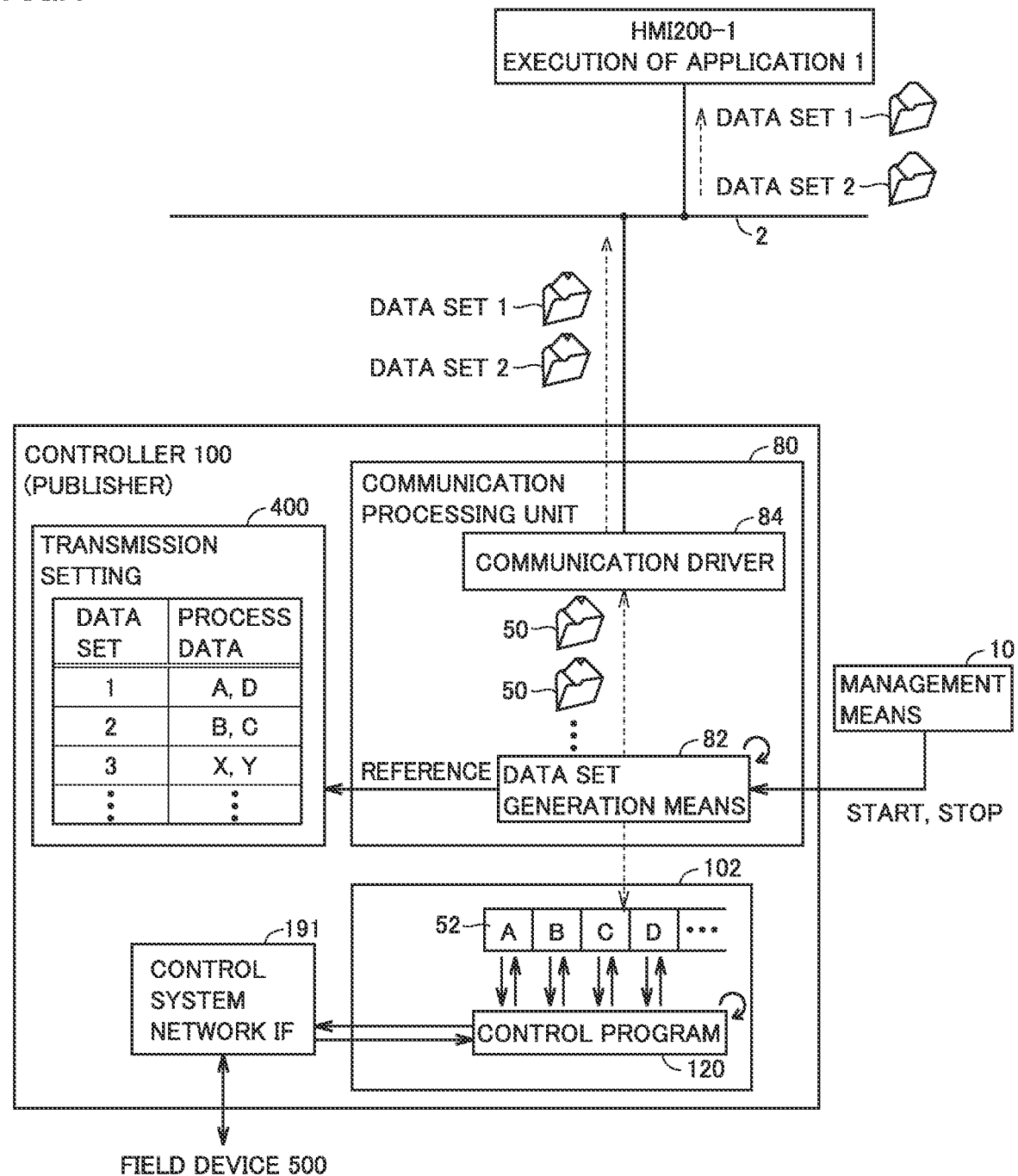
FIG. 4 is a view illustrating an outline of a controller 100 that functions as a publisher.

With reference to FIGS. 3 and 4, an outline of the PubSub communication between HMI 200 and controller 100 will be described. FIG. 3 is a view illustrating an outline of HMI 200 that functions as the subscriber. FIG. 4 is a view illustrating an outline of controller 100 that functions as the publisher.

Referring to FIG. 3, HMI 200 includes a display 242, a plurality of applications 220 (220a, 220b . . . ), and a communication processing unit 90 that is an OPC UA client. Each application 220 is a program displaying a specific page on display 242. FIG. 3 illustrates an example in which an application 1 is executed to display page 1 on display 242.

Each page includes a plurality of objects 54. For example, page 1 includes an object 54a to an object 54d. The display of object 54 is updated according to a value of a variable included in the program. For example, the display of object 54a is updated according to the value of a variable 2. Similarly, the display of object 54b is updated according to the value of a variable 1, the display of object 54c is updated according to the value of a variable 4, and the display of object 54d is updated according to the value of a variable 3.

Application 220 refers to mapping information 222 to update the value of the variable. Mapping information 222 is information in which the variable is associated with process data 52. For example, the value of variable 1 is updated according to the value of process data 52A. The period at which the value of each process data is updated may be set by the user according to the production of application 220, or determined according to the update period of controller 100 that manages the process data.

Communication processing unit 90 is an OPC UA client, and causes HMI 200 to function as the subscriber. Communication processing unit 90 includes a subscription management means 92 and a communication driver 96.

Subscription management means 92 manages the subscription target according to currently-executed application 220. Specifically, subscription management means 92 refers to subscription management information 94 generated based on application 220 and mapping information 222 to specify the subscription target, and notifies communication driver 96 of the subscription target.

Subscription management information 94 is information in which application 220 is associated with process data 52 used in application 220, and is generated based on application 220 and mapping information 222.

For example, when application 1 is executed, subscription management means 92 refers to subscription management information 94 to specify that process data A, B, C, D are used for the execution of application 1. Subscription management means 92 notifies communication driver 96 of the start of the subscription to process data A, B, C, D. When the execution target of the application is switched, subscription management means 92 also notifies communication driver 96 of the information about process data 52 stopping the subscription together with the information about process data 52 starting the subscription.

Communication driver 96 notifies management means 10 of information for specifying process data 52 starting the subscription and process data 52 stopping the subscription, of which communication driver 96 is notified by subscription management means 92. In the following description, the stop of the subscription is also referred to as "requesting to stop the subscription", and the start of the subscription is also referred to as "requesting to start the subscription".

Management means 10 determines data set 50 validating the transmission and data set 50 stopping the transmission based on the subscription stop request and the subscription start request and data set list 14 capable of specifying the type of process data 52 included in each data set 50. The processing of management means 10 will be described later.

Communication driver 96 receives data set 50 including process data 52 of the subscription target, and updates the value of process data 52 used by application 220.

Communication driver 96 reads data set 50 including process data 52 of the subscription target from among the plurality of data sets 50 distributed by controller 100. More specifically, communication driver 96 refers to link information 98 specifying process data 52 stored in each data set 50, and specifies data set 50 including process data 52 of the subscription target from among the plurality of data sets 50 delivered by controller 100.

Link information 98 is generated at timing when transmission setting 400 is generated. The subject that refers to link information 98 is not limited to communication driver 96. For example, the entity that refers to link information 98 may be subscription management means 92. In this case, subscription management means 92 may specify data set 50 necessary for obtaining the value of process data 52 necessary for the execution of application 220, and notify the communication driver of specified data set 50 as the subscription target.

Referring to FIG. 4, controller 100 includes control means 102, a control system network interface (IF) 191, and communication processing unit 80 that is an OPC UA server.

Control means 102 controls field device 500 by executing control program 120. For example, control program 120 updates the value of process data 52 using the state value of field device 500 input through control system network IF 191, and executes the control arithmetic calculation with reference to the updated value of process data 52. Control program 120 updates the value of process data 52 according to the result of the executed control arithmetic calculation, and outputs the updated value of process data 52 as the control value to field device 500 through control system network IF 191.

Communication processing unit 80 is an OPC UA server, and causes controller 100 to function as the publisher. Communication processing unit 80 includes data set generation means 82 that generates data set 50 and a communication driver 84 that transmits data set 50.

Data set generation means 82 refers to transmission setting 400 to generate data set 50 in which the transmission determined by management means 10 is valid. Data set 50 may refer to a set of process data 52 or a data set in a format that can be output onto information system network 2.

Transmission setting 400 is information that specifies process data 52 stored in one data set 50. Only one process data 52 may be specified to be stored in one data set 50, or the plurality of pieces of process data 52 may be specified to be stored in one data set. That is, the term "data set" means a combination of one or more process data 52 stored in data set 50.

That is, controller 100 generates the data set according to transmission setting 400. Thus, the processing load on controller 100 is reduced as compared with the case where transmission setting 400 defines the process data of a specific attribute as one data set.

Transmission settings 400 may include information that defines a condition that generates data set 50. For example, a condition that generates data set 50 may be defined such that data set 50 is generated every period in which the value of process data 52 is updated in association with the execution of control program 120. In this case, the combination of process data 52 included in data set 50 is preferably defined in consideration of the generation condition.

Communication driver 84 distributes data set 50 generated by data set generation means 82 onto information system network 2.

With reference to FIGS. 3 and 4, data exchange between HMI 200 and controller 100 when HMI 200 executes application 1 will be described.

When application 1 is executed, HMI 200 uses process data A, B, C, D. Management means 10 updates validity and invalidity information 12 according to the execution of application 1. Specifically, the transmission of data set 1 in which process data A, D are stored and data set 2 in which process data B, C are stored is validated, and the transmission of other data sets is invalidated. Management means 10 requests controller 100 to start and stop the transmission of data set 50 in response to the update of validity and invalidity information 12. Hereinafter, transmitting data set 50 from controller 100 is also referred to as "publishing".

According to the request from management means 10 and transmission setting 400, controller 100 periodically generates each of data sets 1, 2 and transmits data sets 1, 2 onto information system network 2. Data set 1 stores process data A and process data D, and data set 2 stores process data B and process data C.

HMI 200 acquires data sets 1, 2 in which the values of process data A, B, C, D that are the subscription targets are stored, from among the plurality of data sets 50 distributed from controller 100. Because each of data sets 1, 2 is periodically transmitted, HMI 200 periodically acquires each of data sets 1, 2. Thus, HMI 200 can periodically update the variables corresponding to process data A, B, C, D, and also updates the display of object 54 according to the update of the variables.

<C. Sequence>

Figure 5:
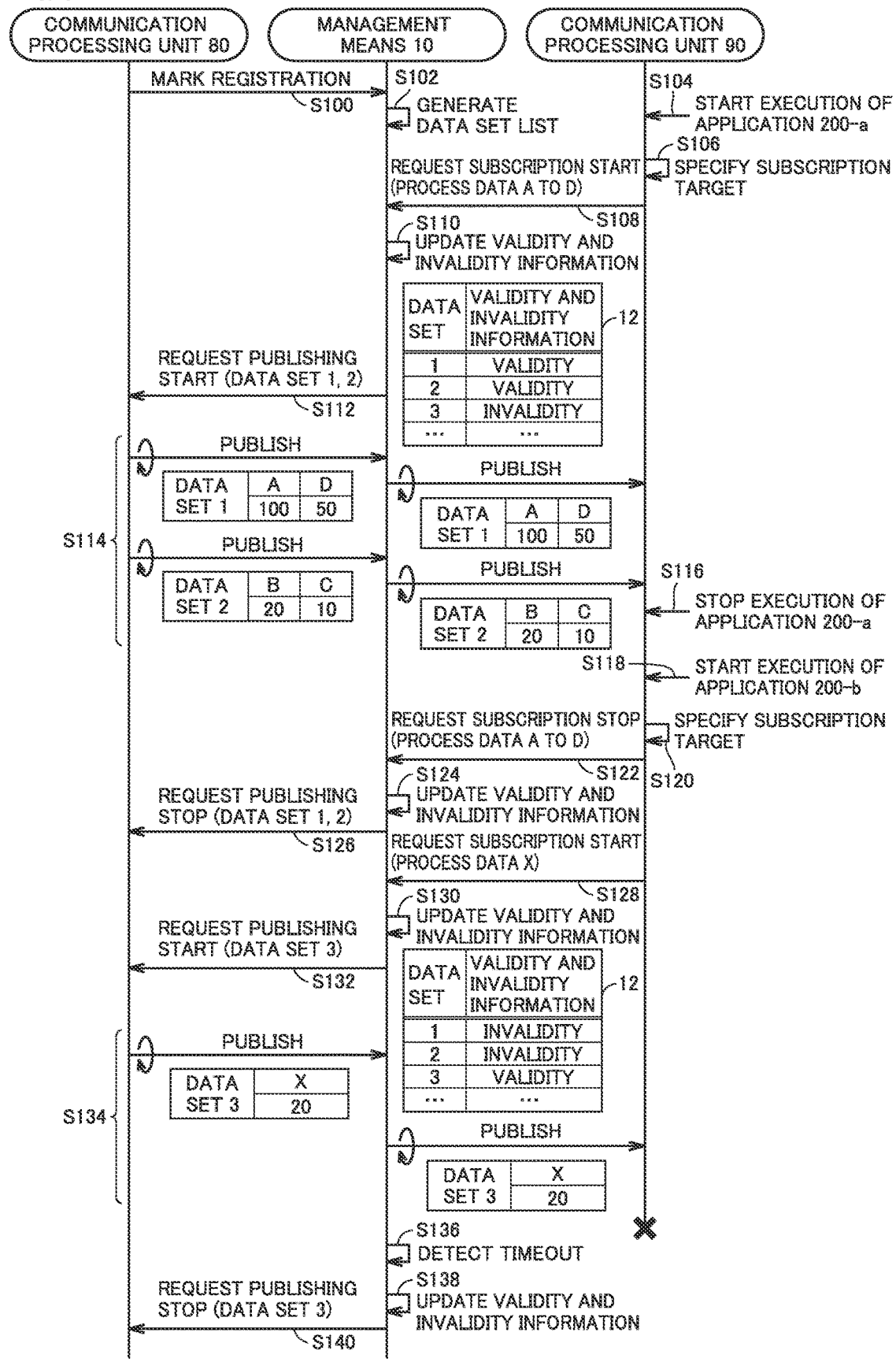
FIG. 5 is a sequence diagram illustrating a flowchart of a series of management by management means 10.

FIG. 5 is a sequence diagram illustrating a flowchart of a series of management by management means 10. Hereinafter, the step is simply referred to as "S".

In S100, communication processing unit 80 registers information indicating transmittable data set 50 and process data 52 stored in each data set 50.

In S102, management means 10 generates data set list 14 based on the information registered by communication processing unit 80.

In S104, it is assumed that the execution of application 220-a is started.

In S106, in association with the start of the execution of application 220-a, communication processing unit 90 of HMI 200 refers to subscription management information 94 to specify process data 52 necessary for the execution of application 220-a (specification of the subscription target).

In S108, communication processing unit 90 of HMI 200 notifies management means 10 of the start of the subscription (subscription start request). The subscription start request in S108 includes information capable of specifying process data 52 of the subscription target. In the example of FIG. 5, notification indicating that the subscription to process data A, B, C, D is started is sent.

In S110, management means 10 updates validity and invalidity information 12 based on the subscription start request. Specifically, management means 10 refers to data set list 14, identifies data set 50 including at least one of process data A, B, C, D, and determines data set 50 to validate the transmission such that all process data 52 are transmitted.

Management means 10 may determine data set 50 validating the transmission according to the evaluation criterion regarding the communication load. For example, management means 10 determines data set 50 validating the transmission such that the load is decreased when data set 50 of communication processing unit 80 is transmitted, such that the reception amount of process data 52 used in HMI 200 during a predetermined period is increased, and such that the communication efficiency is improved between controller 100 and HMI 200.

In the example of FIG. 5, management means 10 validates the transmission of data set 1 in which process data A, D are stored and data set 2 in which process data B, C are stored, and keeps the transmission of other data sets 50 invalid.

In S112, management means 10 notifies communication processing unit 80 of controller 100 that the transmission of data set 1 and data set 2 is validated (publishing start request).

In S114, communication processing unit 80 starts the transmission (publishing) of data set 1 and data set 2. For example, each of data set 1 and data set 2 is periodically transmitted. In addition, in S114, management means 10 transmits each of data set 1 and data set 2 transmitted from communication processing unit 80 toward HMI 200. Data set 1 and data set 2 do not need to be transmitted through management means 10. For example, communication processing unit 80 may transmit data set 1 and data set 2 in the form of multicasting, and communication processing unit 90 of HMI 200 may receive each of multicast data set 1 and data set 2.

It is assumed that page switching is performed, that the execution of application 220-a is stopped in S116, and that the execution of application 220-b is started in S118.

In S120, communication processing unit 90 of HMI 200 refers to subscription management information 94 to specify process data 52 stopping the subscription and process data 52 starting the subscription in association with the execution stop of application 220-a and the execution stop of application 220-b (the specification of the subscription target).

In S122, communication processing unit 90 of HMI 200 notifies management means 10 of the stop of the subscription (subscription stop request). The subscription stop request in S122 includes information capable of specifying process data 52 stopping the subscription. In the example of FIG. 5, the notification of stopping the subscription to process data A, B, C, D is sent.

Further, communication processing unit 90 of HMI 200 may refer to subscription management information 94 and link information 98 to specify data set 50 stopping the subscription and data set 50 starting the subscription. In this case, communication processing unit 90 of HMI 200 may include information capable of specifying data set 50 stopping the subscription in the subscription stop request.

In this manner, HMI 200 may change the executed application according to the user operation and notify management means 10 of the process data necessary for the application after the change.

In S124, management means 10 updates validity and invalidity information 12 based on the subscription stop request. Specifically, in the example of FIG. 5, management means 10 invalidates the transmission of data set 1 and data set 2.

Management means 10 may manage process data 52 (A, B, C, D) for which the subscription start request has been made while process data 52 is associated with the type of validated data set 50 in S108 and S110. This facilitates the processing for the subscription stop request.

In S126, management means 10 notifies communication processing unit 80 of controller 100 that the transmission of data set 1 and data set 2 is invalidated (publishing stop request). In accordance with the publishing stop request in S124, communication processing unit 80 stops the transmission of data set 1 and data set 2 started from S114.

As described above, when unnecessary data set 50 is generated in data set 50 transmitted by communication processing unit 80 of controller 100 according to the application executed by HMI 200, management means 10 instructs communication processing unit 80 of controller 100 to stop the transmission of the unnecessary data set.

In S128, the communication processing unit 90 of the HMI 200 notifies the management means 10 of the start of the subscription (subscription start request). The subscription start request in S128 includes information capable of specifying process data 52 of the subscription target. In the example of FIG. 5, the notification indicating that the subscription to process data X is started is sent.

In S130, management means 10 updates validity and invalidity information 12 based on the subscription start request. Specifically, management means 10 refers to data set list 14 to determine data set 50 for which transmission is validated such that process data X is transmitted. In the example of FIG. 5, management means 10 validates the transmission of data set 3 in which process data X is stored, and keeps the transmission of other data sets 50 invalid.

In S132, management means 10 notifies communication processing unit 80 of controller 100 that the transmission of data set 3 is validated (publishing start request).

In S134, communication processing unit 80 starts the transmission (publishing) of data set 3. For example, data set 3 is periodically transmitted. In addition, in S134, management means 10 transmits data set 3 transmitted from communication processing unit 80 toward HMI 200.

In S136, it is assumed that management means 10 detects that data set 3 cannot be transmitted to communication processing unit 90 (timeout).

In S138, management means 10 updates validity and invalidity information 12 based on the detection of the timeout. Specifically, in the example of FIG. 5, management means 10 invalidates the transmission of data set 3. That is, management means 10 determines that the communication with communication processing unit 90 is interrupted by the detection of the timeout, and determines that the subscription request from communication processing unit 90 is stopped.

In S140, management means 10 notifies communication processing unit 80 of controller 100 that the transmission of data set 3 is invalidated (publishing stop request). In accordance with the publishing stop request in S140, communication processing unit 80 stops the transmission of data set 3 started from S134.

As described above, management means 10 instructs communication processing unit 80 of controller 100 to stop the transmission of data set 50 that is not received by HMI 200. Thus, the transmission of unnecessary data set 50 is stopped.

<D. Mounting Example of Management Means>

Figure 6:
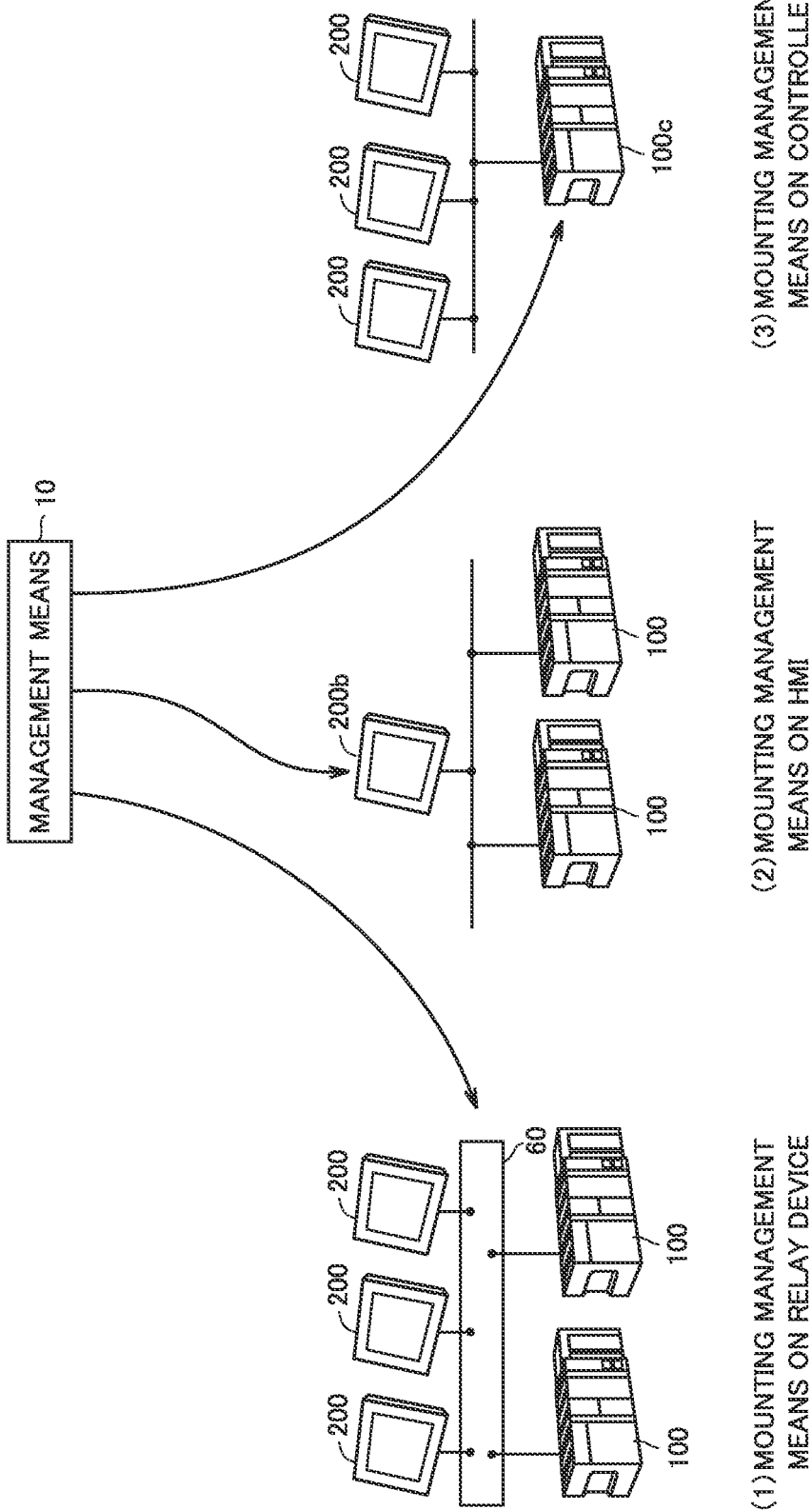
FIG. 6 is a view illustrating an example of a device on which the management means 10 can be mounted.

A device on which management means 10 of the embodiment can be mounted and processing when management means 10 is mounted on the device will be described. FIG. 6 is a view illustrating an example of the device on which management means 10 can be mounted.

Referring to FIG. 6, management means 10 is mounted on (1) relay device 60 that relays the communication between controller 100 and HMI 200, (2) an HMI 200b, or (3) a controller 100c.

That is, as illustrated in (1), management means 10 may be mounted independently of controller 100 and HMI 200. Alternatively, as illustrated in (2), management means 10 may be mounted on HMI 200b. Alternatively, as illustrated in (3), management means 10 may be mounted on controller 100c.

Hereinafter, the HMI in which the function of management means 10 is executed is set to HMI 200b, and the controller in which the function of management means 10 is executed is set to controller 100c.

When process data 52 managed by controller 100 is used for a plurality of HMIs 200 and when a plurality of pieces of process data 52 managed by different controllers 100 are used in one or a plurality of applications 220 executed by HMI 200 (N to N), it is effective to mount the function of management means 10 on relay device 60.

In the case of N to N, HMI 200b or controller 100c may be used. When HMI 200b is used, the function of management means 10 is preferably mounted on each of the plurality of HMIs. When controller 100c is used, the function of management means 10 is preferably mounted on each of the plurality of controllers.

(d1. Relay Device)

Figure 7:
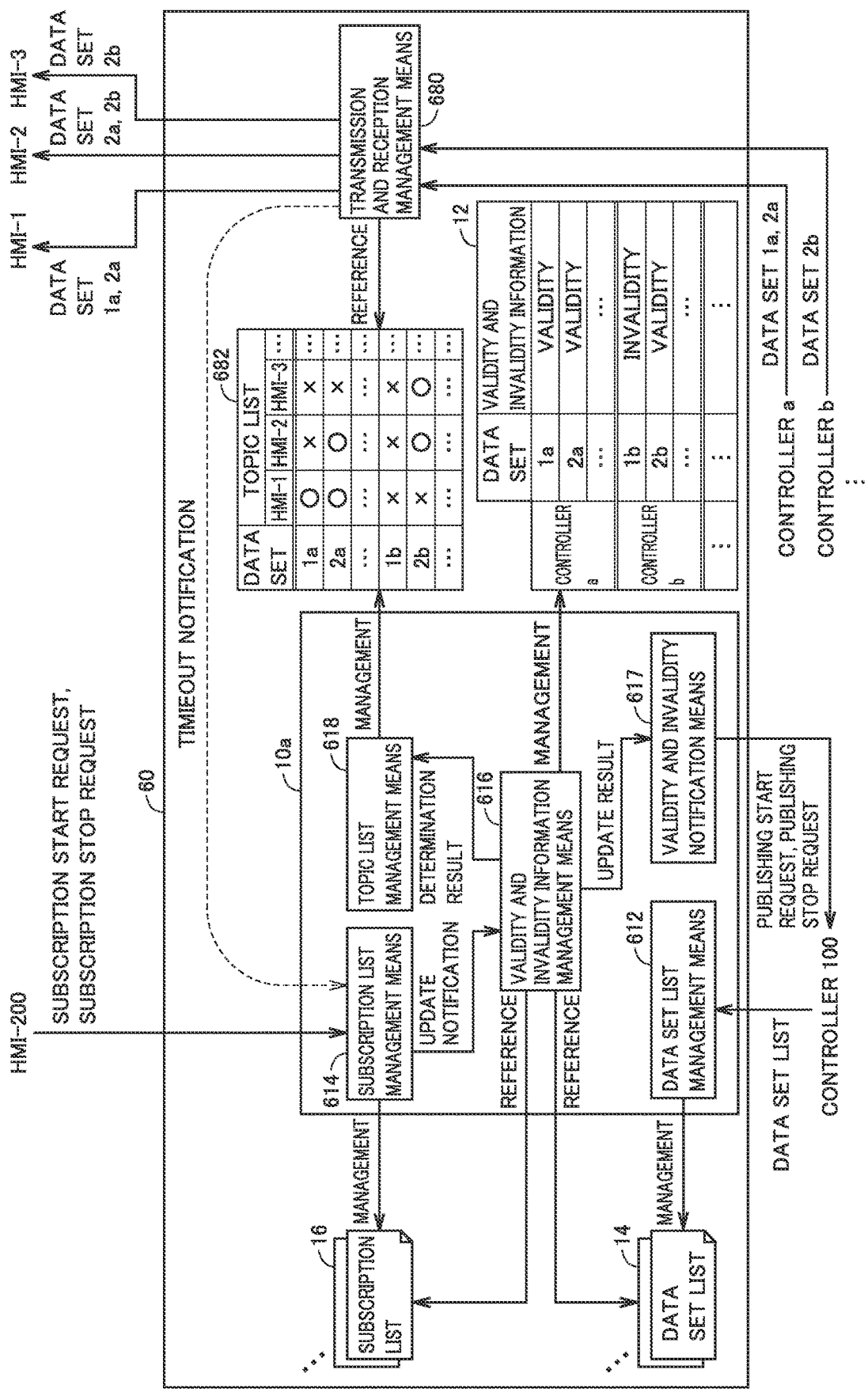
FIG. 7 is a view illustrating a functional configuration of a relay device 60 when management means is mounted on the relay device 60.

FIG. 7 is a view illustrating a functional configuration of relay device 60 when the management means is mounted on relay device 60. Relay device 60 in FIG. 7 can be connected to a plurality of controllers 100 (controller a, controller b . . . ) and a plurality of HMIs 200 (HMI-1, HMI-2, HMI-3 . . . ). In a case where it is not necessary to particularly distinguish the plurality of controllers 100 and the plurality of HMIs 200 from each other, the plurality of controllers and the plurality of HMIs are simply referred to as controller 100 and HMI 200.

Referring to FIG. 7, relay device 60 includes management means 10a and transmission and reception management means 680. Management means 10a is an example of management means 10, and includes data set list management means 612, subscription list management means 614, validity and invalidity information management means 616, validity and invalidity notification means 617, and topic list management means 618.

Data set list management means 612 manages data set list 14 capable of specifying the type of process data 52 stored in each data set 50. Data set list management means 612 manages data set list 14 for each controller 100.

Subscription list management means 614 manages subscription list 16 that can specify process data 52 that is the subscription target in each HMI 200. Specifically, subscription list management means 614 updates subscription list 16 in response to the subscription start request and the subscription stop request from each HMI 200.

Validity and invalidity information management means 616 manages validity and invalidity information 12. Validity and invalidity information management means 616 manages validity and invalidity information 12 based on data set list 14 and subscription list 16. In response to the update of subscription list 16 by subscription list management means 614, validity and invalidity information management means 616 determines whether to update validity and invalidity information 12.

When the number of types of process data 52 of the subscription target increases or the number of HMIs 200 in which process data 52 is subscribed increases in response to the new subscription start request, validity and invalidity information management means 616 determines whether the newly received subscription start request can be satisfied by data set 50 in which the transmission is valid.

When the type of process data 52 of the subscription target is reduced or HMI 200 in which process data 52 is subscribed is reduced in response to the subscription stop request, validity and invalidity information management means 616 determines whether unnecessary data set 50 exists in data sets 50 in which the transmission is valid.

When the subscription start request cannot be satisfied or unnecessary data set 50 exists, validity and invalidity information management means 616 determines that validity and invalidity information 12 is updated.

When validity and invalidity information 12 is determined to be updated, validity and invalidity information management means 616 newly validates the transmission of data set 50 so as to respond to the subscription start request, and invalidates the transmission of unnecessary data set 50.

Validity and invalidity information management means 616 may determine data set 50 validating the transmission and data set 50 invalidating the transmission according to the evaluation criterion regarding the communication load. For example, validity and invalidity information management means 616 may update validity and invalidity information 12 in consideration of a balance between transmission efficiency and a change degree of setting regarding the validity and the invalidity of the transmission.

In response to the update of validity and invalidity information 12, validity and invalidity notification means 617 makes the publishing start request and the publishing stop request to each controller 100.

Topic list management means 618 manages topic list 682 capable of specifying HMI 200 that transmits each data set 50. Topic list management means 618 updates topic list 682 by receiving the determination result of validity and invalidity information management means 616. Specifically, validity and invalidity information management means 616 refers to subscription list 16 to determine whether the subscription request of each HMI 200 is satisfied, and updates validity and invalidity information 12 when the subscription request is not satisfied. In other words, validity and invalidity information management means 616 determines data set 50 to be transmitted to each HMI 200 in order to satisfy the subscription request of each HMI 200.

Topic list management means 618 manages the type of data set 50 to be transmitted to HMI 200 determined by validity and invalidity information management means 616 as topic list 682 for each HMI 200.

Transmission and reception management means 680 refers to topic list 682 to transmit each data set 50 delivered from controller 100 to HMI 200 in which the process data 52 included in data set 50 is the subscription target. In this case, each controller 100 distributes data set 50 according to validity and invalidity information 12.

In the example of FIG. 7, the transmission of data sets 1*a* and 2*a* transmittable from controller a is set to be valid, and the transmission of data set 2*b* transmittable from controller b is set to be valid. HMI-1 subscribes to data sets 1*a*, 2*a*. HMI-2 subscribes to data sets 2*a*, 2*b*. HMI-3 subscribes to data set 2*b*.

Transmission and reception management means 680 transmits data set 1*a* transmitted from controller a to HMI-1, transmits data set 2*a* transmitted from controller a to HMI-1 and HMI-2, and transmits data set 2*b* transmitted from controller b to HMI-2 and HMI-3.

In addition, transmission and reception management means 680 monitors the communication with HMI 200 and notifies subscriber list management means 614 of the timeout when the communication with HMI 200 is interrupted for a predetermined period or more. Upon receiving the timeout notification, subscription list management means 614 assumes that the subscription request is not received from timeout HMI 200 and updates subscription list 16 of HMI 200. According to this update, validity and invalidity information 12 and topic list 682 are updated.

Figure 8:
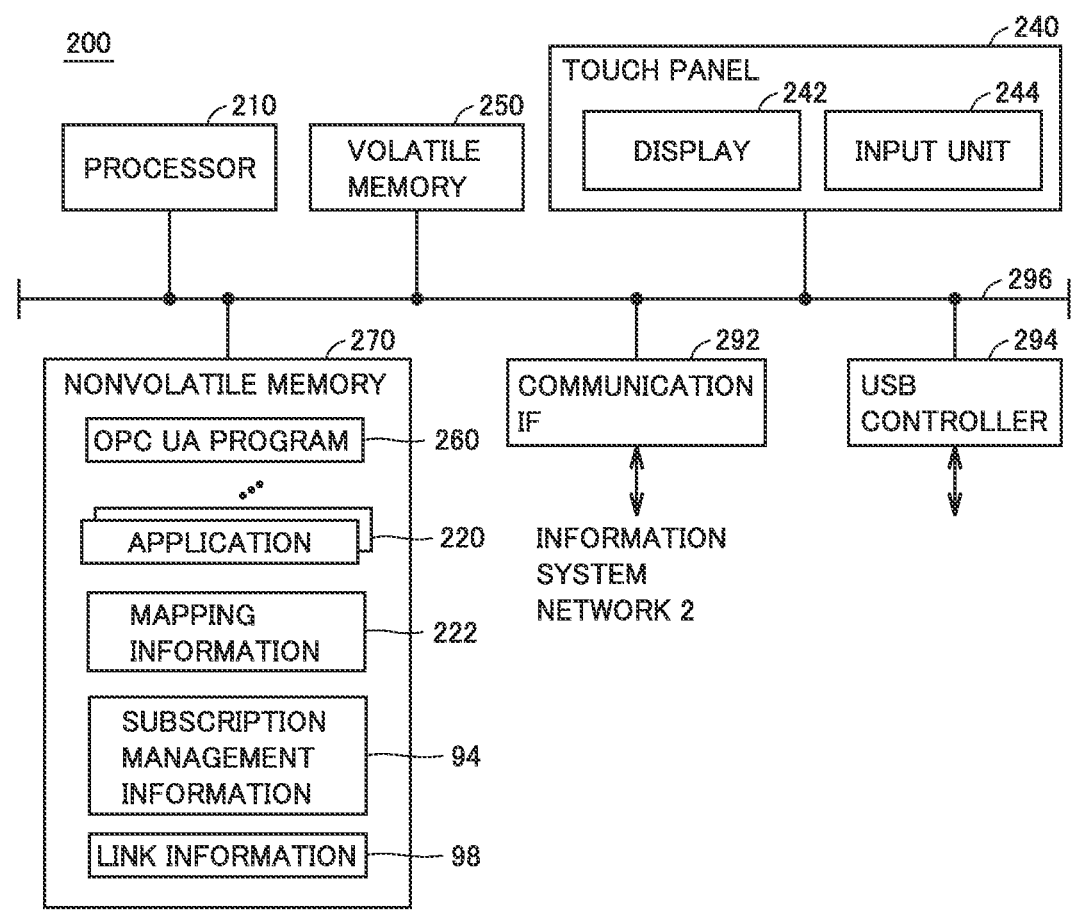
FIG. 8 is a schematic diagram illustrating an example of a hardware configuration of an HMI 200.

FIG. 8 is a schematic diagram illustrating an example of a hardware configuration of HMI 200. As an example, HMI 200 is implemented using hardware (for example, a general-purpose personal computer) according to a general-purpose architecture. HMI 200 may be a stationary type or provided in the form of a notebook personal computer having excellent portability at a manufacturing site where controller 100 is disposed. Referring to FIG. 8, HMI 200 includes a processor 210, a touch panel 240, a volatile memory 250, a nonvolatile memory 270, a communication IF 292, and a universal serial bus (USB) controller 294. These components are connected to each other through a processor bus 296.

Processor 210 includes a central processing unit (CPU), a graphical processing unit (GPU), or the like, reads a program stored in nonvolatile memory 270, expands the program in volatile memory 250, and executes the program, thereby outputting various types of information obtained by the execution of control program 120 to touch panel 240.

Volatile memory 250 is configured by a dynamic random access memory (DRAM), a static random access memory (SRAM), or the like. For example, nonvolatile memory 270 is configured by a hard disk drive (HDD), a solid state drive (SSD), or the like.

Nonvolatile memory 270 stores an OPC UA program 260, subscription management information 94, link information 98, one or a plurality of applications 220, and mapping information 222 in addition to an OS (not illustrated) implementing basic functions.

OPC UA program 260 is a program causing HMI 200 to function as the subscriber, and is a program performing the communication according to the OPC UA between controller 100 and HMI 200. Processor 210 executes OPC UA program 260 to provide the functions regarding communication processing unit 90 in FIG. 3. OPC UA program 260 is installed in non-volatile memory 270 from another external storage medium (for example, a memory card or a server device on a network).

Although the configuration example in which processor 210 executes the program to provide the necessary functions has been described, some or all of these provided functions may be mounted using a dedicated hardware circuit (for example, an application specific integrated circuit (ASIC), a field-programmable gate array (FPGA)). In addition, the function provided by HMI 200 may be implemented using a part of the module provided by the OS.

Touch panel 240 includes a display 242 that is the display and an input unit 244 that receives the operation of the user. Display 242 and input unit 244 may be configured separately.

Communication IF 292 is in charge of the data exchange with other devices (for example, relay device 60) connected to information system network 2. USB controller 294 is in charge of the data exchange with arbitrary information processing device through USB connection.

Figure 9:
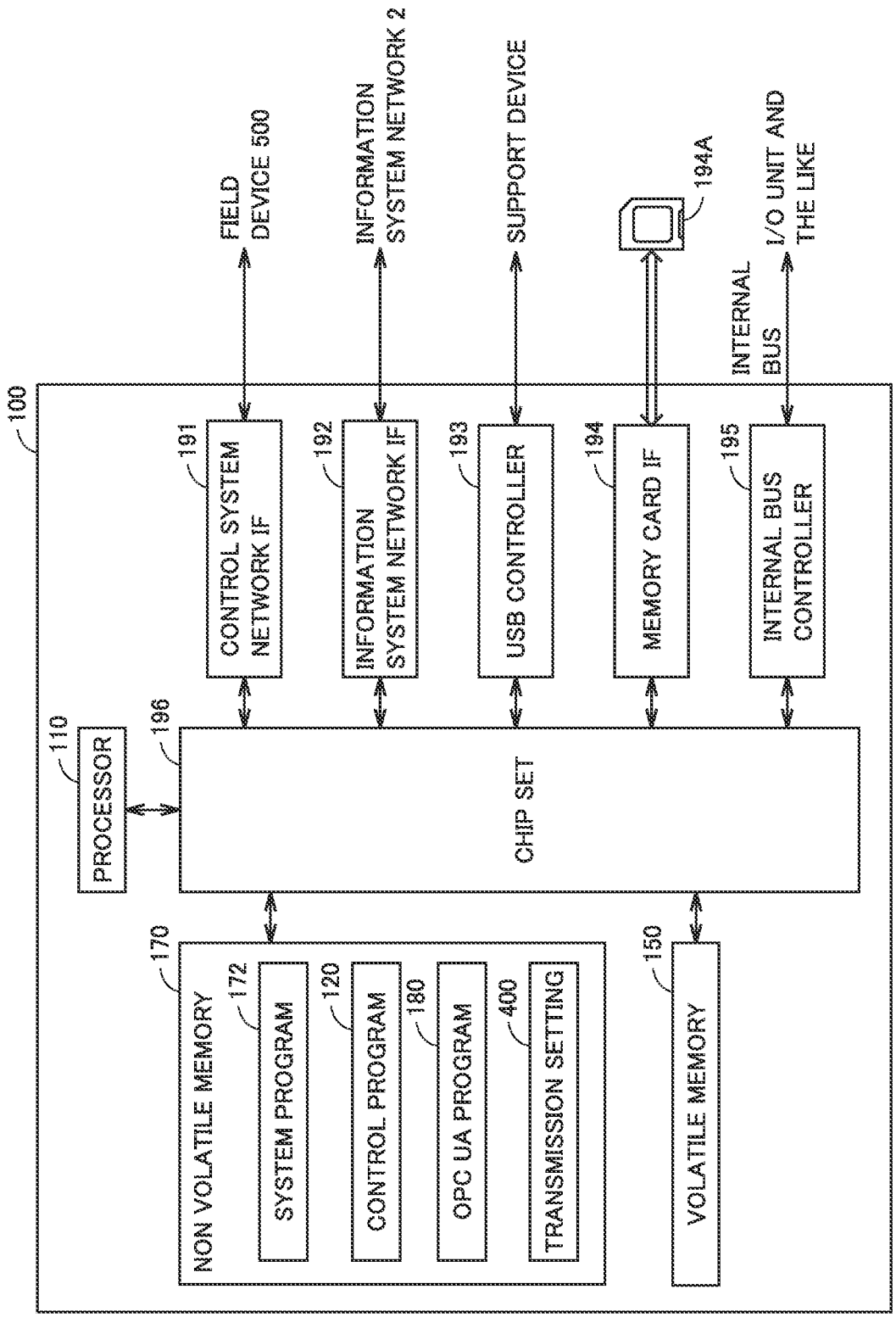
FIG. 9 is a schematic diagram illustrating an example of a hardware configuration of a controller 100.

FIG. 9 is a schematic diagram illustrating an example of a hardware configuration of controller 100. Referring to FIG. 9, controller 100 includes a processor 110, a chipset 196, a nonvolatile memory 170, a volatile memory 150, a control system network IF 191, an information system network IF 192, a USB controller 193, a memory card IF 194, and an internal bus controller 195 as main components.

Processor 110 is configured by a CPU, a GPU, and the like, and reads various programs stored in nonvolatile memory 170, develops the programs in volatile memory 150, and executes the programs, thereby implementing the control of field device 500 and the function as the publisher. A chipset 196 mediates the exchange of data between processor 110 and each component, thereby implementing the processing of controller 100 as a whole.

Nonvolatile memory 170 stores system program 172, control program 120, OPC UA program 180, and transmission setting 400.

System program 172 is a program that provides basic functions of controller 100. Typically, control program 120 is a user program generated by the user who operates and designs a support device that supports program development. Control program 120 and system program 172 cooperate to achieve the control purpose for the user, thereby controlling field device 500. Processor 110 executes system program 172 to provide the function of control means 102, executes control program 120, and updates process data 52 associated with the execution of control program 120.

OPC UA program 180 is a program causing controller 100 to function as the publisher, and is a program performing the communication according to the OPC UA between controller 100 and HMI 200. Processor 110 executes OPC UA program 180 to provide the functions regarding communication processing unit 80 in FIG. 4. For example, OPC UA program 180 may be previously installed in controller 100 as a type of the system program, or installed in nonvolatile memory 170 from another external storage medium (for example, memory card 194A and the server device on the network).

Although the configuration example in which the necessary functions are provided by processor 110 executing the program has been described, some or all of these provided functions may be mounted using a dedicated hardware circuit (for example, ASIC or FPGA). In addition, the main part of controller 100 may be implemented using hardware (for example, an industrial personal computer based on a general-purpose personal computer) according to a general-purpose architecture. In this case, a plurality of OSs having different uses may be executed in parallel using a virtualization technology, and the necessary application may be executed on each OS.

Control system network IF 191 is in charge of the data exchange with field device 500.

Information system network IF 192 is in charge of the data exchange with other devices (for example, relay device 60) connected to information system network 2.

USB controller 193 is in charge of the data exchange with an arbitrary information processing device (support device) through the USB connection.

Memory card IF 194 is configured such that memory card 194A is detachable, the data such as the control program and various settings can be written in memory card 194A, and the data such as the control program and various settings can be read from memory card 194A.

Internal bus controller 195 is an interface that exchanges the data with an I/O unit (not illustrated) mounted on controller 100. For the internal bus, a communication protocol unique to a manufacturer may be used, or a communication protocol that is the same as or compliant with any of industrial network protocols may be used.

Figure 10:
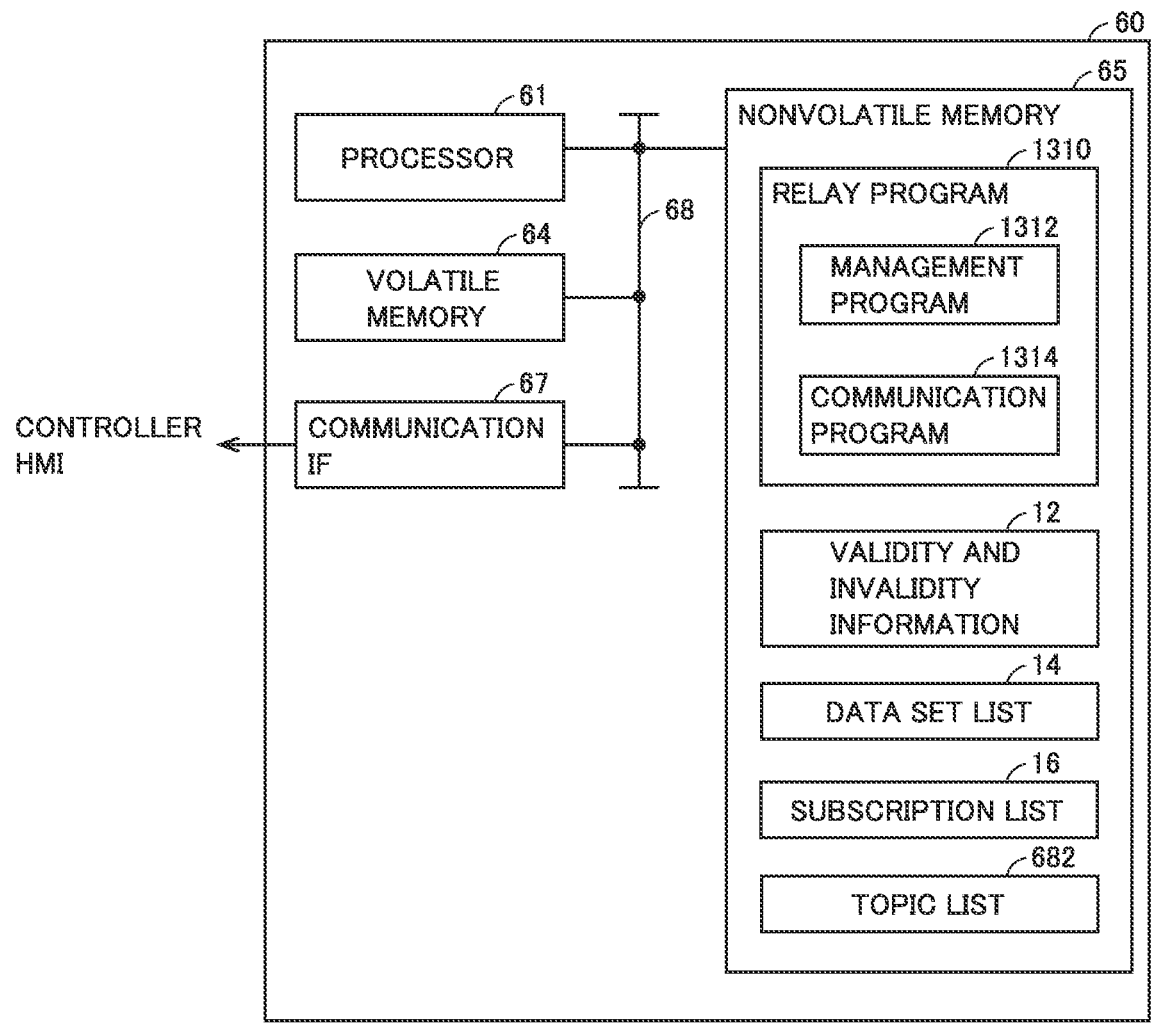
FIG. 10 is a schematic diagram illustrating an example of a hardware configuration of the relay device 60.

FIG. 10 is a schematic diagram illustrating an example of a hardware configuration of relay device 60. Referring to FIG. 10, relay device 60 is an arbitrary information processing device, and includes a processor 61, a volatile memory 64, a nonvolatile memory 65, and a communication IF 67. These components are connected to each other through a processor bus 68.

Processor 61 includes a CPU, a GPU, and the like, and reads a program stored in nonvolatile memory 65, develops the program in volatile memory 64, and executes the program, thereby providing the functions of determining transmission setting 400 and relaying the communication between controller 100 and HMI 200.

Volatile memory 64 includes a DRAM, an SRAM, or the like. For example, nonvolatile memory 65 includes an HDD or an SSD.

Nonvolatile memory 65 stores a relay program 1310, validity and invalidity information 12, data set list 14, subscription list 16, and topic list 682 in addition to an OS implementing the basic functions.

Relay program 1310 is a program relaying the communication between controller 100 and HMI 200 and determining transmission setting 400, and is executed by processor 61 to provide functions of various means in FIG. 7. Relay program 1310 includes a management program 1312 implementing management means 10a that determines the validity of the transmission of data set 50 and a communication program 1314 implementing transmission and reception management means 680 that transmits data set 50 transmitted from controller 100 to each HMI 200.

Although the configuration example in which the necessary functions are provided by processor 61 executing the program has been described, some or all of these provided functions may be mounted using a dedicated hardware circuit (for example, ASIC or FPGA). Furthermore, the function provided by relay device 60 may be implemented using a part of the module provided by the OS.

The various programs stored in nonvolatile memory 65 may be installed through the computer-readable recording medium, or installed by being downloaded from the server device or the like on the network.

Communication IF 67 exchanges the data with each device (controller 100, HMI 200) connected to information system network 2.

(d2. HMI)

Figure 11:
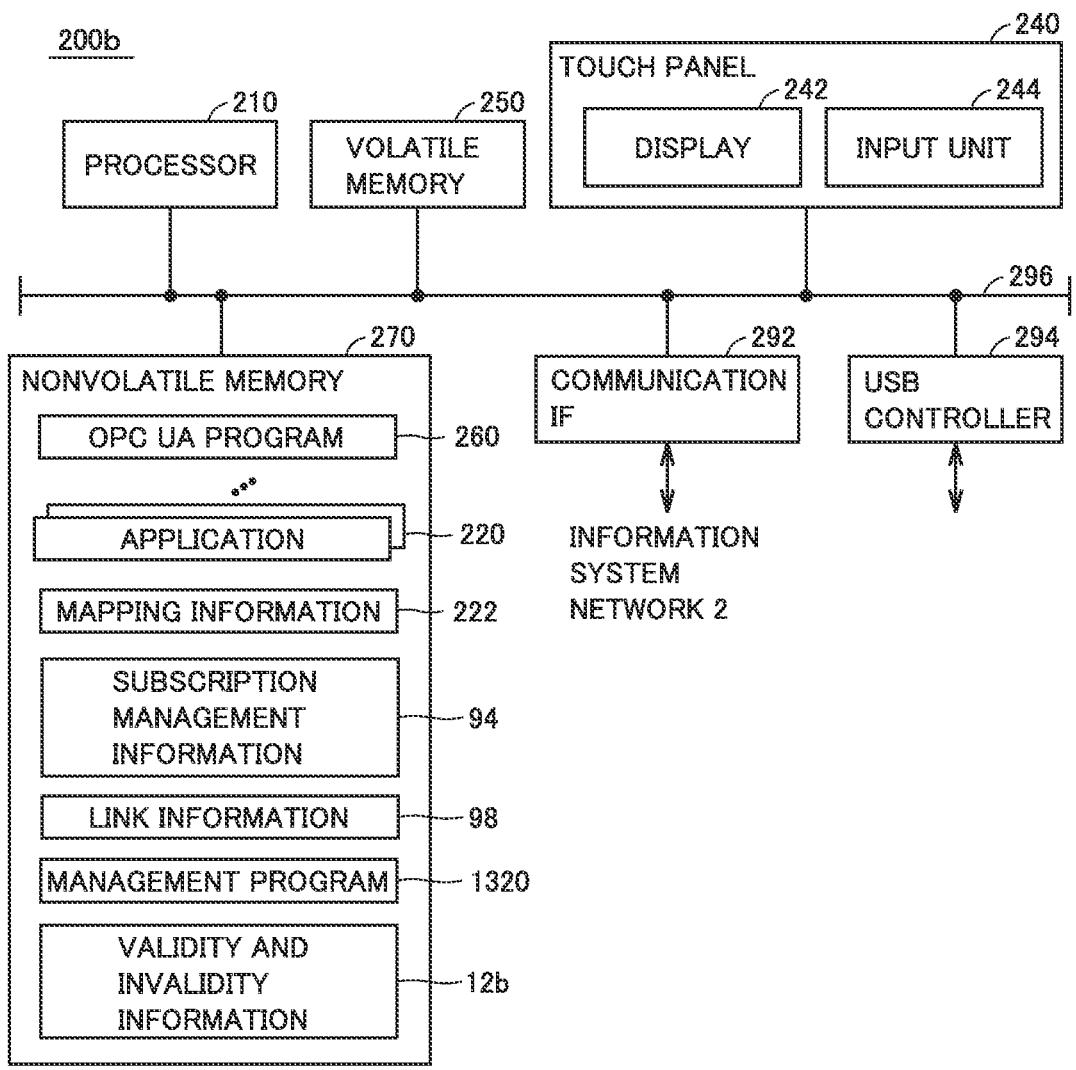
FIG. 11 is a schematic diagram illustrating an example of a hardware configuration of an HMI 200b on which the management means 10 is mounted.

FIG. 11 is a schematic diagram illustrating an example of a hardware configuration of HMI 200b on which management means 10 is mounted. HMI 200b is different from HMI 200 in that HMI 200b includes a management program 1320 and validity and invalidity information 12b.

Processor 210 implements the function regarding the management means by executing management program 1320. Processor 210 specifies process data 52 of the subscription target by executing OPC UA program 260 program.

Processor 210 executes management program 1320, specifies data set 50 necessary for obtaining process data 52 of the subscription target by referring to link information 98 specifying process data 52 stored in each data set 50, and updates validity and invalidity information 12b.

Processor 210 notifies controller 100 of updated validity and invalidity information 12b by executing management program 1320. HMI 200 may transmit validity and invalidity information 12b in the form of multicasting, or transmit validity and invalidity information 12b only to controller 100 that transmits data set 50 in which the validity or the invalidity is changed.

Further, the controller included in the control system including the plurality of HMIs 200b may have a function of arbitrating the validity and invalidity information from each HMI 200b. For example, when one data set is instructed to invalidate the transmission from one HMI and instructed to validate the transmission from the other HMI, the controller may arbitrate the instruction from each HMI so as to give the priority to the valid instruction.

(d3. Display Controller)

Figure 12:
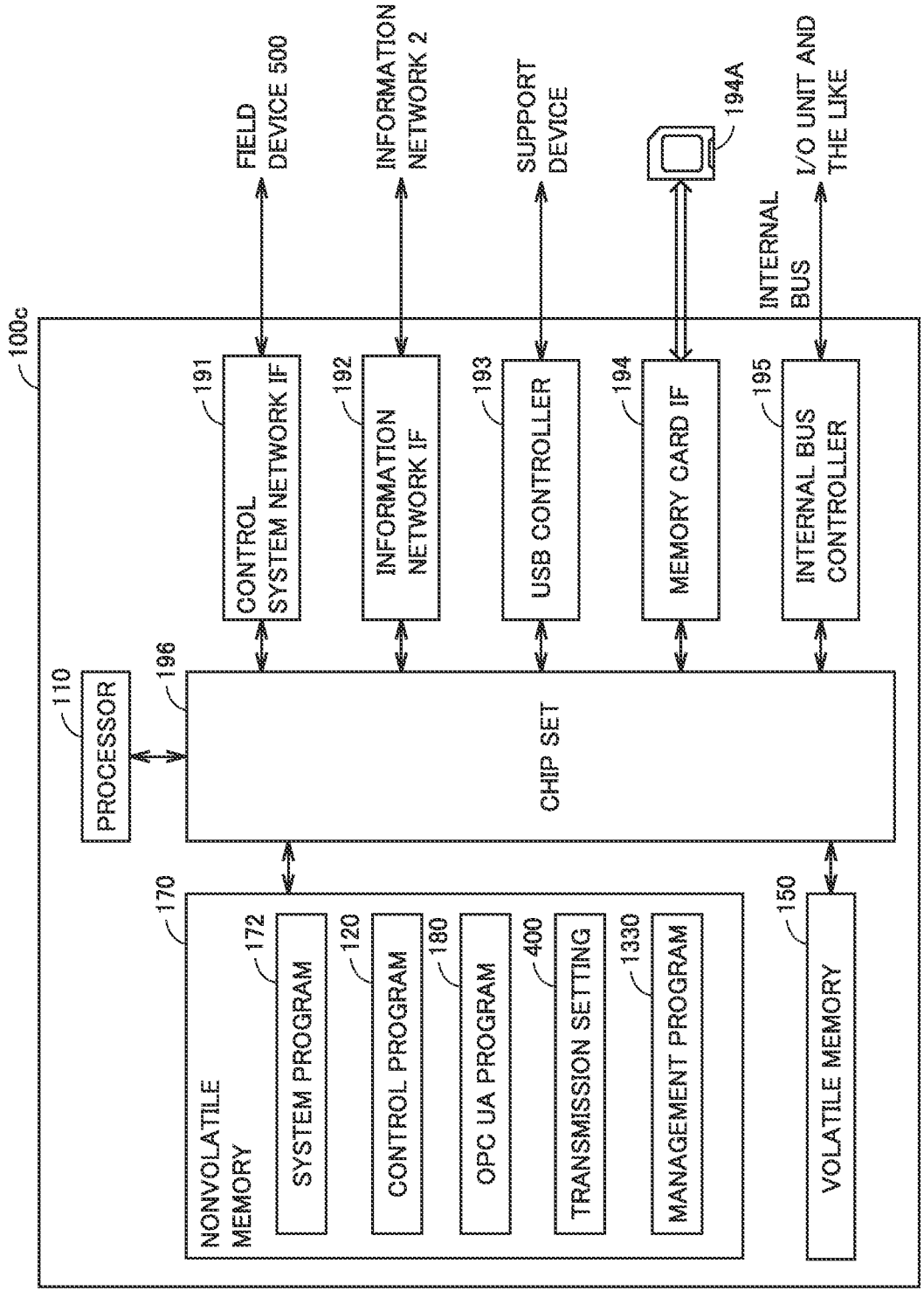
FIG. 12 is a schematic diagram illustrating an example of a hardware configuration of a controller 100c on which the management means 10 is mounted.

FIG. 12 is a schematic diagram illustrating an example of a hardware configuration of controller 100c on which management means 10 is mounted. Controller 100c is different from controller 100 in that controller 100c includes a management program 1330.

Processor 110 implements the function regarding the management means by executing management program 1330. Processor 110 executes management program 1330 by receiving the subscription start request or the subscription stop request from HMI 200.

Processor 210 executes management program 1320, and refers to transmission setting 400 to determine whether the transmission of each data set 50 is validate or invalidate so as to satisfy the subscription start request or the subscription stop request.

Processor 210 executes OPC UA program 180 to transmit data set 50 of the transmission target, the data set 50 being determined associated with the execution of management program 1320.

Here, controller 100c executes management program 1320 every time when application 220 executed by HMI 200 is switched, when new HMI 200 is connected, or when HMI 200 is disconnected.

For this reason, management program 1320 is frequently executed in a system in which HMI 200 frequently joins or leaves the network or in a site in which the page switching of HMI 200 frequently occurs, and there is a possibility that a large load is applied to processor 110.

Accordingly, the function of management program 1330 can be arbitrarily limited. For example, the function of management program 1330 may be stopped by operating a support device connected through USB controller 193.

<E. Determination of Transmission Settings>

Figure 13:
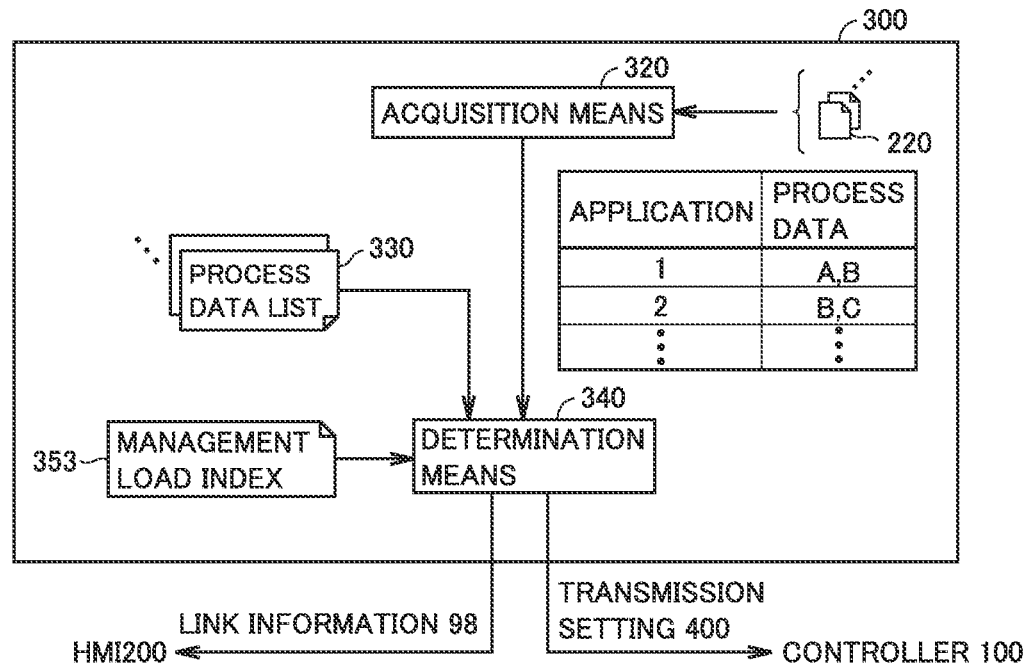
FIG. 13 is a view illustrating an example of a functional configuration of a support device 300.

With reference to FIG. 13, a method for determining transmission setting 400 will be described. For example, the function for determining transmission setting 400 is provided by support device 300. FIG. 13 is a view illustrating an example of a functional configuration of support device 300. Support device 300 is an implementation example of the determination means, and determines the plurality of data sets based on the process data used in each of one or the plurality of applications executed by the application execution means.

For example, support device 300 is used at timing of starting the connection between controller 100 and HMI 200. Support device 300 provides a development environment of application 220 executed by HMI 200 and a development environment of control program 120 executed by controller 100, and provides an environment for setting a communication environment between controller 100 and HMI 200. Such the development environment and the setting environment are provided by installing a support program in support device 300. For example, the support program is "Sysmac Studio" (product of OMRON Corporation).

The determination means may be mounted on relay device 60, the monitoring device that monitors a network including controller 100 and HMI 200, or data set generation means 82 of controller 100.

Referring to FIG. 13, support device 300 includes acquisition means 320 and determination means 340. Acquisition means 320 acquires necessary process data 52 for each of one or the plurality of applications 220 executed by each HMI 200.

Determination means 340 determines the number of data sets 50 transmitted by communication processing unit 80 and process data 52 to be included in each data set 50 such that each of process data 52 used in each application 220 is transmitted from controller 100 toward HMI 200 based on the information indicating process data 52 necessary for each of one or the plurality of applications 220 acquired by acquisition means 320.

When each of process data 52 necessary for each of one or the plurality of applications 220 acquired by acquisition means 320 is managed by different controllers, determination means 340 may refer to process data list 330 that can identify the controller that manages each process data, and group process data 52 for each controller that manages process data 52. Determination means 340 determines the number of data sets 50 transmitted by communication processing unit 80 and process data 52 to be included in each data set 50 for each grouped process data.

Furthermore, determination means 340 determines process data 52 to be included in each data set 50 according to management load index 353. Management load index 353 is an index evaluating the load applied to management means 10. More specifically, based on the fact that the control system includes management means 10, determination means 340 determines process data 52 to be included in each data set 50 such that management means 10 can easily manage the validity and the invalidity of data set 50.

Furthermore, determination means 340 generates link information 98 at the timing when process data 52 to be included in each data set 50 is determined. Determination means 340 sends link information 98 to HMI 200 and sends transmission setting 400 to controller 100. More specifically, support device 300 includes the USB controller and is communicably connected to controller 100 or HMI 200 by the USB connection, and determination means 340 transmits information to each of controller 100 and HMI 200 through the USB cable.

<F. Modification of Subscription Request of Subscription>

Figure 14:
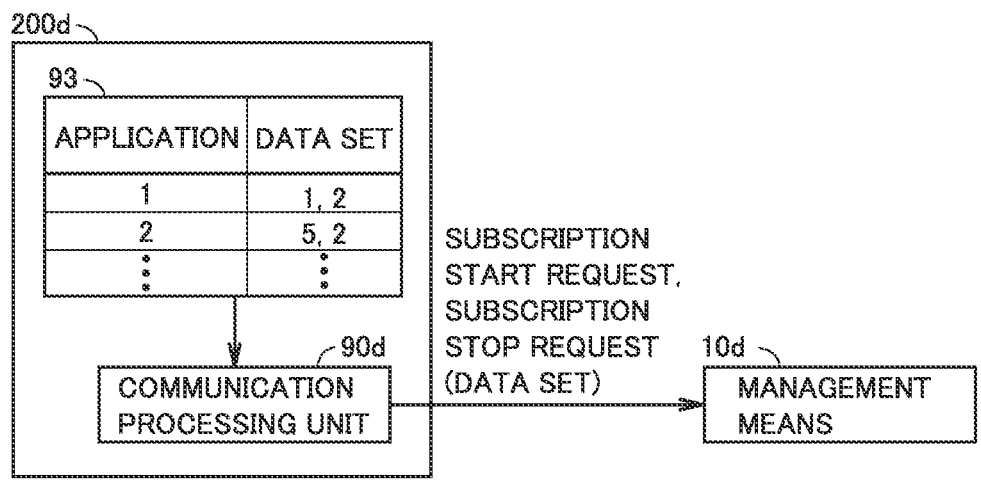
FIG. 14 is a view illustrating a modification of a subscription request of subscription.

In the above embodiment, HMI 200 makes a notification of process data 52 stopping or starting the subscription in the subscription request of the subscription. FIG. 14 is a view illustrating a modification of the subscription request of the subscription.

A HMI 200*d* may specify necessary data set 50 and unnecessary data set 50 due to the start of the stop of the execution of the application. A communication processing unit 90*d* may notify management means 10*d* of specified data set 50 together with the subscription request of the subscription.

That is, HMI 200*d* changes the executed application according to the user operation, and notifies management means 10*d* of data set 50 necessary for the application after the change. For this reason, management means 10*d* can determine the data set to be transmitted in response to an explicit request from HMI 200*d*.

When application 220 is changed according to the user operation, for example, HMI 200*d* may include application information 93 in which the application and data set 50 necessary for the application are associated with each other, and determine the method by which communication processing unit 90*d* specifies data set 50 necessary for the application based on application information 93. Furthermore, communication processing unit 90*d* may make the determination based on link information 98 indicating process data 52 stored in each data set 50 and subscription management information 94.

Furthermore, for example, application information 93 is generated at the timing in FIG. 13 where transmission setting 400 is generated.

<G. Other Modifications>

In the above embodiment, the HMI is the subscriber while the controller is the publisher has been described. Each of the HMI and the controller may have both functions of the subscriber and the publisher.

In this case, the control program is configured to be able to use the data distributed from the HMI. The validity and invalidity of the transmission of the data set from the HMI may be determined according to the control program executed in the controller or the state of the controller. The method for determining the validity and the invalidity of data set 50 from controller 100 described above can be used as a method for determining the validity and the invalidity of the transmission of the data set from the HMI.

Further, in the above embodiment, in order to simplify the description, all the pieces of process data 52 used in the application are transmitted by one controller 100, but each of the plurality of pieces of process data 52 used in application 220 may be transmitted from different controllers 100.

In this case, management means 10 may group the process data or the data set included in the subscription request for each controller that transmits the process data or the data set, and determine the validity or the invalidity of the transmission of each process data or each data set included in the group for each group.

<H. Appendix>

As described above, the embodiment includes the following disclosure.

(Configuration 1)

A control system including: a control unit (102) configured to execute a control program (120) controlling a control target, and manage a plurality of pieces of process data (52) referred to or updated in the control program; a transmission unit (80) configured to be capable of transmitting a plurality of data sets (50) including values of the plurality of pieces of process data managed by the control unit, each of the plurality of data sets including one or a plurality of predetermined process data values; an application execution unit (200) configured to execute one or a plurality of applications using the value of the process data included in the data set transmitted by the transmission unit; and a management unit (10) configured to determine a data set validating transmission in the plurality of data sets transmittable by the transmission unit according to the application executed by the application execution unit.

(Configuration 2)

The control system described in configuration 1, in which the management unit instructs the transmission unit to stop transmission of an unnecessary data set when the unnecessary data set is generated in the data set transmitted by the transmission unit according to the application executed by the application execution unit (S126).

(Configuration 3)

The control system described in configuration 1 or 2, in which the application execution unit changes an application to be executed according to a user operation, and notifies the management unit of a data set necessary for the application after the change (S122, 90*d*).

(Configuration 4)

The control system described in any one of configurations 1 to 3, in which the management unit instructs the transmission unit to stop transmission of the data set not received by the application execution unit (S136, S138, S140).

(Configuration 5)

The control system (1) described in any one of configurations 1 to 4 further includes a control device (100) and a display device (200), in which the control unit and the transmission unit are mounted on the control device, the application execution unit is mounted on the display device, and the management unit is mounted independently of the control device and the display device.

(Configuration 6)

The control system (1) described in any one of configurations 1 to 4 further includes a control device (100) and a display device (200), in which the control unit, the transmission unit, and the management unit are mounted on the control device, and the application execution unit is mounted on the control device.

(Configuration 7)

The control system described in any one of configurations 1 to 6 further includes a determination unit (340) configured to determine the plurality of data sets based on the process data used in each of one or the plurality of applications executed by the application execution unit.

(Configuration 8)

A relay device (60) disposed in a control system, in which the control system includes: the control unit (102) configured to execute a control program (120) controlling a control target, and manage a plurality of pieces of process data (52) referred to or updated in the control program; a transmission unit (80) configured to be capable of transmitting a plurality of data sets (50) including values of the plurality of pieces of process data managed by the control unit, each of the plurality of data sets including one or a plurality of predetermined process data values; and an application execution unit (200) configured to execute one or a plurality of applications using the value of the process data included in the data set transmitted by the transmission unit, and the relay device determines a data set validating transmission in the plurality of data sets transmittable by the transmission unit according to the application executed by the application execution unit.

(Configuration 9)

A relay program (1310) executed by an information processing device (60) disposed in a control system, in which the control system includes: a control unit (102) configured to execute a control program (120) controlling a control target, and manage a plurality of pieces of process data (52) referred to or updated in the control program; a transmission unit (80) configured to be capable of transmitting a plurality of data sets (50) including values of the plurality of pieces of process data managed by the control unit, each of the plurality of data sets including one or a plurality of predetermined process data values; and an application execution unit (200) configured to execute one or a plurality of applications using the value of the process data included in the data set transmitted by the transmission unit, and the relay program causes the information processing device to execute: managing information about the plurality of data sets transmittable by the transmission unit (S110, S130); and determining a data set to validate transmission in the plurality of data sets transmittable by the transmission unit according to the application executed by the application execution unit (S112, S126, S132, S140).

It should be considered that the disclosed embodiment is an example in all respects and not restrictive. The scope of the present invention is defined by not the above description, but the claims, and it is intended that all modifications within the meaning and scope of the claims are included in the present invention. In addition, the inventions described in the embodiment and the modification are intended to be implemented alone or in combination as much as possible.

REFERENCE SIGNS LIST

1, 1*a*: control system, 2: information system network, 4: control system network, 10, 10*a*, 10*d*: management means, 12, 12*b*: validity and invalidity information, 14: data set list, 16: subscription list, 20: setting device, 50: data set, 52: process data, 54: object, 60: relay device, 616: validity and invalidity information management means, 61, 110, 210: processor, 64, 150, 250: volatile memory, 65, 170, 270: non-volatile memory, 67, 292: communication IF, 68, 296: processor bus, 80, 90, 90*d*: communication processing unit, 82: data set generation means, 84, 96: communication driver, 92: subscription management means, 94: subscription management information, 98: link information, 100, 100*c*: controller, 102: control means, 120: control program, 172: system program, 180, 260: OPC UA program, 191: control system network IF, 192: information system network IF, 193, 294: USB controller, 194: memory card IF, 194A: memory card, 195: internal bus controller, 196: chip set, 220: application, 222: mapping information, 240: touch panel, 242: display, 244: input unit, 300: support device, 320: acquisition means, 340: determination means, 400: transmission setting, 500: field device, 612: data set list management means, 614: subscription list management means, 617: validity and invalidity notification means, 618: topic list management means, 680: transmission and reception management means, 682: topic list, 1310: relay program, 1312, 1320, 1330: management program, 1314: communication program

The invention claimed is:

1. A control system comprising:
a controller;
a management unit; and
an application execution unit,
wherein the controller includes:
  a control unit configured to execute a control program controlling a control target, and manage a plurality of pieces of process data referred to or updated in the control program; and
  a communication processing unit configured to be capable of transmitting a plurality of data sets including values of the plurality of pieces of process data managed by the control unit, each of the plurality of data sets including one or a plurality of predetermined process data values,
wherein:
  the application execution unit is configured to execute one or a plurality of applications using the value of the process data included in the data set transmitted by the communication processing unit,
  the management unit is configured to determine a data set validating transmission in the plurality of data sets transmittable by the communication processing unit according to the application executed by the application execution unit,
  the data set validating transmission corresponds to a data set for which the management unit requests the communication processing unit to transmit,
  the one or a plurality of applications includes a first application and second application,
  the plurality of pieces of process data include first process data necessary for executing the first application and second process data necessary for executing the second application,
  the management unit is configured to update validity and invalidity information for determining transmission to start and transmission to stop of each of the plurality of data sets according to the application executed by the application execution unit,
  when receiving a start request to transmit the first process data from the application execution unit, the management unit refers to a data set list capable of specifying a type of process data included in each data set, and updates the validity and invalidity information so that a corresponding first data set indicates a transmission start state, and after that, transmits a first start request for requesting a start of transmission of the first data set to the communication processing unit,
  when receiving the first start request, the communication processing unit starts a process of repeatedly transmitting the first data set,
  when changing the application to be executed from the first application to the second application in response to a user operation, the application execution unit transmits a stop request to stop the transmission of the first process data to the management unit, and after that, transmits a start request to transmit the second process data necessary for execution of the second application to the management unit, when receiving the stop request to stop the transmission of the first process data from the application execution unit, the management unit refers to the data set list, and updates the validity and invalidity information so that the corresponding first data set indicates a transmission stop state, and after that, transmits a first stop request for requesting a stop of the transmission of the first data set to the communication processing unit, when receiving the first stop request, the communication processing unit stops the process of repeatedly transmitting the first data set, when receiving the start request to transmit the second process data from the application execution unit, the management unit refers to the data set list, and updates the validity and invalidity information so that a corresponding second data set indicates a transmission start state, and after that, transmits a second start request for requesting a start of transmission of the second data set to the communication processing unit, and when receiving the second start request, the communication processing unit starts a process of repeatedly transmitting the second data set.

2. The control system according to claim 1, wherein the management unit instructs the communication processing unit to stop transmission of an unnecessary data set when the unnecessary data set is generated in the data set transmitted by the communication processing unit according to the application executed by the application execution unit.

3. The control system according to claim 1, wherein the management unit instructs the communication processing unit to stop transmission of the data set not received by the application execution unit.

* * * * *